US010655954B2

(12) United States Patent
Wang et al.

(10) Patent No.: US 10,655,954 B2
(45) Date of Patent: May 19, 2020

(54) THREE-DIMENSIONAL SHAPE, DISPLACEMENT, AND STRAIN MEASUREMENT DEVICE AND METHOD USING PERIODIC PATTERN, AND PROGRAM THEREFOR

(71) Applicant: NATIONAL INSTITUTE OF ADVANCED INDUSTRIAL SCIENCE AND TECHNOLOGY, Tokyo (JP)

(72) Inventors: Qinghua Wang, Tsukuba (JP); Shien Ri, Tsukuba (JP); Hiroshi Tsuda, Tsukuba (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 0 days.

(21) Appl. No.: 16/328,309

(22) PCT Filed: Jun. 1, 2017

(86) PCT No.: PCT/JP2017/020435
§ 371 (c)(1),
(2) Date: Feb. 26, 2019

(87) PCT Pub. No.: WO2018/061321
PCT Pub. Date: Apr. 5, 2018

(65) Prior Publication Data
US 2019/0212130 A1     Jul. 11, 2019

(30) Foreign Application Priority Data

Sep. 27, 2016   (JP) ................................ 2016-188217

(51) Int. Cl.
*G01B 11/16*     (2006.01)
*G01B 11/25*     (2006.01)
(Continued)

(52) U.S. Cl.
CPC ............ *G01B 11/161* (2013.01); *G01B 11/16* (2013.01); *G01B 11/25* (2013.01); *G01B 11/254* (2013.01);
(Continued)

(58) Field of Classification Search
CPC ....... G01B 11/161; G01B 11/25; G01B 11/16; G01B 11/254; G01N 21/45; G01J 9/02; G01J 2009/0234
See application file for complete search history.

(56) References Cited

U.S. PATENT DOCUMENTS

2015/0029514 A1   1/2015   Wang et al. .................. 356/512

FOREIGN PATENT DOCUMENTS

JP   62-115307 A   5/1987
JP   2009-264852 A   11/2009
(Continued)

OTHER PUBLICATIONS

International Search Report dated Aug. 22, 2017 in corresponding PCT International Application No. PCT/JP2017/020435.
(Continued)

*Primary Examiner* — Hwa Andrew Lee
(74) *Attorney, Agent, or Firm* — Ostrolenk Faber LLP

(57) ABSTRACT

In a conventional moiré method, achieving both measurement accuracy and dynamic measurement and balancing field of view and measurement accuracy have been difficult. The present invention makes it possible to handle conventional moiré fringes as a grating for generating phase-shifted second-order moiré fringes, use a spatial phase shift method algorithm to accurately analyze the phases of the second-order moiré fringes before and after deformation, and determine shape from the phase differences between gratings projected onto the surface of an object of measurement and a reference surface and determine deformation and strain
(Continued)

from the phase differences between the second-order moiré fringes, before and after deformation, of a repeating pattern on the object surface or a produced grating. As a result, it is possible to measure the three-dimensional shape and deformation distribution of an object accurately and with a wide field of view or dynamically and with a high degree of accuracy.

8 Claims, 23 Drawing Sheets

(51) Int. Cl.
 *G01J 9/02* (2006.01)
 *G01N 21/45* (2006.01)
(52) U.S. Cl.
 CPC .............. *G01J 9/02* (2013.01); *G01N 21/45* (2013.01); *G01J 2009/0234* (2013.01)

(56) References Cited

FOREIGN PATENT DOCUMENTS

| JP | 2015-141151 A | 8/2015 |
|----|---------------|--------|
| JP | 5818218 B2 | 11/2015 |
| JP | 2016-142726 A | 8/2016 |
| JP | 2017-146202 A | 8/2017 |
| WO | WO 2015/008404 A1 | 1/2015 |

OTHER PUBLICATIONS

Written Opinion dated Aug. 22, 2017 in corresponding PCT International Application No. PCT/JP2017/020435.

Qinghua Wang et al., "Developments and Applications of Moire Techniques for Deformation Measurement, Structure Characterization and Shape Analysis," Recent Patents on Materials Science, vol. 8, No. 3, pp. 188-207 (2015).

Yoshiharu Morimoto et al., "Displacement and Strain Distribution Measurement by Sampling Moire Method," Journal of the Vacuum Society of Japan, vol. 54, No. 1, pp. 32-38, Mar. 11, 2011, (with English abstract).

Qinghua Wang et al: "Digital sampling Moiré as a substitute for microscope scanning Moiré for high-sensitivity and full-field deformation measurement at micron/nano scales", Applied Optics, vol. 55, No. 25, (Aug. 23, 2016), p. 6858, XP055671074, Washington, DC; US ISSN: 0003-6935, DOI: 10.1364/AO.55.006858.

Qinghua Wang et al: "Formation of secondary Moiré patterns for characterization of nanoporous Alumina structures in multiple domains with different orientations", Nanoscale, vol. 5, No. 6, (Feb. 8, 2013), p. 2285, XP055671058, United Kingdom, ISSN: 2040-3364, DOI: 10.1039/c3nr34042b.

N-step phase shifting method (PSM)

(Intensity data = N)

Sampling moire method (SMM)

Spatial
(Intensity data = M)

Spatiotemporal phase shifting method (ST-PSM)

(Intensity data = M × N)

(a)

(b)

(c)

(d)

(a)

(b)

(c)

THREE-DIMENSIONAL SHAPE, DISPLACEMENT, AND STRAIN MEASUREMENT DEVICE AND METHOD USING PERIODIC PATTERN, AND PROGRAM THEREFOR

CROSS-REFERENCE TO RELATED APPLICATIONS

The present application is a 35 U.S.C. §§ 371 national phase conversion of PCT/JP2017/020435, filed Jun. 1, 2017, which claims priority to Japanese Patent Application No. 2016-188217, filed Sep. 27, 2016, the contents of which are incorporated herein by reference. The PCT International Application was published in the Japanese language.

TECHNICAL FIELD

An object of the present invention is to develop 2nd-order moiré technology and a program therefor in order to measure a three-dimensional shape, a displacement distribution or a strain distribution of a specimen with high accuracy and a wide field of view. It belongs to the fields of non-destructive measurement, experimental mechanics and optical technology.

BACKGROUND ART

Measurement of the shape and deformation of an object is extremely important for evaluating mechanical properties, structural instability, crack propagation, and residual stress. With miniaturization and integration of products, measurement of deformation at millimeter, micron, and nanoscale levels has attracted much attention in the field of materials science.

Techniques generally used for measurement of the three-dimensional shape and measurement of minute deformation of an object at present include the digital image correlation (DIC) method, electronic speckle pattern interferometry (ESPI), geometric phase analysis (GPA), the phase analysis methods (for example, Fourier transformation, the phase shifting method, the spatiotemporal phase shifting method, and the like), and the moiré methods, and the like as optical full-field measurement methods.

Although DIC has high measurement accuracy, it is disadvantageous in that the deformation measurement is easily influenced by the disturbance of noise. ESPI is significantly sensitive to vibration. Since the specimen grating should be directly observed in GPA, the field of view is narrower than that in the scanning moiré method. The Fourier transformation method is another method for analyzing small-scale deformation in a plane, but the field of view is also narrower because the specimen grating to be used should be observed (the width of the field of view is usually less than 100 times the pitch of a grating).

The moiré methods are effective for performing non-destructive measurement of the deformation distribution from changes in moiré fringes before and after deformation. Among various moiré methods, the microscope moiré method, the CCD or CMOS moiré method (hereinafter, referred to as the CCD moiré method), moiré interferometry, the sampling moiré method, the digital moiré method, and the overlapped (geometric) moiré method have attracted much attention and are applied to deformation measurement of various materials and structures.

The microscope moiré method and moiré interferometry are suitable for measurement of micron/nanoscale deformation using a microscope. The CCD moiré method, the sampling moiré method, the digital moiré method, and the overlapped moiré method can be used to measure nanoscale to meter scale deformation in the case in which a grating image can be acquired.

The moiré methods have been applied to measurement of strains of materials such as metals, polymer, and composite materials and deformation of structures such as bridges and buildings. In addition, it is possible to drastically improve measurement accuracy of deformation measurement by analyzing the phase of moiré fringes from a grating image.

Phase analysis of a fringe grating (fringes or a grating, hereinafter, simply referred to as fringes) image include a phase shifting method for analyzing a phase using a plurality of phase-shifted fringe images as shown in FIG. 1, the sampling moiré method for analyzing a phase using only one fringe image, and the spatiotemporal phase shifting method in which a phase shifting method and the sampling moiré method are combined.

In the phase shifting method and the spatiotemporal phase shifting method, it is necessary to capture a plurality of fringe images, and thus the methods cannot be applied to dynamic measurement. The sampling moiré method can analyze a phase from one fringe image and can be applied to dynamic measurement, but there is a problem in that it is impossible to perform high-accuracy measurement in an environment with much noise. A high-accuracy three-dimensional shape and deformation measurement method performed by capturing one fringe image is desired.

CITATION LIST

Patent Literature

[Patent Literature 1]
 Japanese Patent No. 5818218: Method and device for analyzing a phase distribution of a fringe image using high-dimensional intensity information, and program for the same; Shien Ri
[Patent Literature 2]
 PCT International Publication No. WO/2015/008404: Method and device for measuring displacement distribution using regular pattern, and program for such method and device; Shien Ri and Hiroshi Tsuda
[Patent Literature 3]
 Japanese Patent Application No. 2016-028169 (2016.2.17): Method and device for measuring high-speed displacement and strain distribution using moiré method; Qinghua Wang, Shien Ri, and Takashi Tokizaki

Non-Patent Literature

[Non-Patent Literature 1]
 Qinghua Wang, Hiroshi Tsuda and Huimin Xie, Developments and Applications of Moiré Techniques for Deformation Measurement, Structure Characterization and Shape Analysis, Vol. 8, No. 3, pp. 188-207 (2015)

SUMMARY OF INVENTION

Technical Problem

In the traditional moiré methods including the microscope moiré method, the CCD moiré method, moiré interferometry, the sampling moiré method, the digital moiré method, and the overlapped moiré method, it is difficult to balance the field of view and measurement accuracy.

In the microscope moiré method, the CCD moiré method, moiré interferometry, the digital moiré method, and the overlapped moiré method, the fringe centering technique is usually adopted for deformation measurement. Since only the center lines of the moiré fringes are used for calculation of the deformation distribution, the measurement accuracy of deformation is not high.

In the case in which the spatiotemporal phase shifting method disclosed in Patent Literature 1 is used, it is possible to improve measurement accuracy in the microscope and the CCD moiré method. However, the operation of recording a plurality of phase-shifted moiré fringes and grating images is time consuming and is not suitable for dynamic measurement easily influenced by vibration.

In the sampling moiré method, measurement accuracy can be improved using the spatial phase shifting method, but it is not possible to realize both high accuracy and a wide field of view at the same time. A specimen having a larger grating pitch imparts high measurement accuracy, but has a decreased field of view. A specimen having a smaller grating pitch (less than 3 pixels) can be set to have a wide field of view, but the spatial phase shifting method for calculating deformation cannot be executed.

The aim is to achieve high measurement accuracy of deformation and a wide field of view (FIG. 2) or high accuracy and dynamic measurement at the same time.

Solution to Problem

The present invention proposes a 2nd-order moiré method as an innovative deformation measurement technique for achieving a wide field of view and high accuracy or high accuracy and dynamic measurement at the same time.

A core idea is to treat the recorded or generated traditional moiré fringes as a grating for generating a phase-shifted 2nd-order moiré fringe pattern. The phase of the 2nd-order moiré fringes can be calculated more accurately using an algorithm such as the spatial phase shifting method or the spatiotemporal phase shifting method.

It is possible to determine the shape and out-of-plane displacement distribution from the phase difference between gratings projected on the surface of a measurement target and a reference surface, or determine the displacement and strain distributions from the phase difference between 2nd-order moiré fringes before and after a grating attached to the surface of an object is deformed.

As a result, it is possible to measure the three-dimensional shape and out-of-plane displacement distribution, or the in-plane displacement and strain distributions of the object accurately with a wide field of view or dynamically with high accuracy.

Formation of 2nd-Order Moiré Fringes

Scanning lines of a microscope, the pixel array of a camera, a virtual grating (down-sampling pixel array), or a digital grating can be used as the reference grating.

When there is a slight mismatch or misalignment between the specimen grating and the reference grating, traditional moiré fringes will appear from interference between the specimen grating and the reference grating (FIG. 3(a)).

Traditional moiré fringes include microscope moiré fringes, CCD moiré fringes, sampling moiré fringes, and digital moiré fringes.

These traditional moiré fringes are treated as gratings.

When down-sampling processing is performed with a pitch $T^{(2)}$ close to an interval $P_m$ of the traditional moiré fringes and intensity interpolation is performed on each of down-sampling images by shifting the starting point of down-sampling by one pixel for each of $(T^{(2)}-1)$ times, it is possible to obtain phase-shifted 2nd-order moiré fringes with a $T^{(2)}$ step as shown in FIG. 3(b).

There are three methods of generating 2nd-order moiré fringes and three methods of calculating a phase distribution thereof.

Calculation Principle 1 of Phase Distribution of 2nd-Order Moiré Fringes (Case in which Moiré Fringes are Treated as Grating)

FIG. 4 shows the principle of a method of generating the first kind of 2nd-order moiré fringes and calculating a phase distribution.

The pitch of the specimen grating and the pitch of the reference grating (the microscope scanning line or the camera imaging pixel digital grating) in the x-direction (or the y-direction, the direction will be omitted below) are defined as P and T, respectively.

Phase expressions of the specimen grating and the reference grating are $\varphi_s=2\pi x/P$ (or $\varphi_s=2\pi y/P$) and $\varphi_r=2\pi x/T$ (or $\varphi_r=2\pi y/T$), respectively.

The intensity distribution of the traditional moiré fringes is expressed by Equation (1) on the assumption that A(x,y) denotes the amplitude of the moiré fringe, $\varphi_0$ denotes an initial phase, and B(x,y) includes the background intensity- and high-order frequencies ($2\pi x/P$, $2\pi x(1/P+1/T)$, and the like). Moiré fringes having a pitch interval $P_m$ ($1/P_m=1/P-1/T$) are generated by a slight difference between the grating pitch P of the specimen and the reference grating or the down-sampling pitch T.

[Math. 1]

$$I_m(x, y) = A(x, y)\cos\left[2\pi y\left(\frac{1}{P} - \frac{1}{T}\right) + \varphi_0\right] + B(x, y) \quad (1)$$

When the high-order frequencies are excluded, the phase of the traditional moiré fringes is expressed by Equation (2).

[Math. 2]

$$\varphi_m(x) = 2\pi y\left(\frac{1}{P} - \frac{1}{T}\right) + \varphi_0 \quad (2)$$

In order to improve the measurement accuracy of the shape and deformation, the traditional moiré fringes are analyzed by a spatial phase shifting method in the sampling moiré method.

The traditional moiré fringes are treated as a "grating" used when phase-shifted 2nd-order moiré fringes are generated.

When a down-sampling pitch is assumed to be $T^{(2)}$, the intensity of the 2nd-order moiré fringes can be expressed by Equation (3) on the assumption that $A^{(2)}(x,y)$ denotes the amplitude of the 2nd-order moiré fringes, k denotes a number of the phase shifting procedure, and $B^{(2)}(x,y)$ includes the background intensity and high-order frequencies ($2\pi x/P$, $2\pi x(1/P+1/T)$, and the like) of the 2nd-order moiré fringes.

[Math. 3]

$$I_m^{(2)}(x, y; k) = \quad (3)$$
$$A^{(2)}(x, y)\cos\left[2\pi x\left(\frac{1}{P} - \frac{1}{T} - \frac{1}{T^{(2)}}\right) + \varphi_0 + 2\pi\frac{k}{T^{(2)}}\right] + B^{(2)}(x, y)$$
$$(k = 0, 1, \ldots, T^{(2)} - 1)$$

As a result, the phase of the 2nd-order moiré fringes is expressed by Equation (4) and can be calculated by one-dimensional discrete Fourier transform (DFT) or fast Fourier transform (FFT).

[Math. 4]

$$\varphi_m^{(2)}(x) = 2\pi x\left(\frac{1}{P} - \frac{1}{T} - \frac{1}{T^{(2)}}\right) + \varphi_0 = \arg\left\{\sum_{k=0}^{T^{(2)}-1} [I_m^{(2)}(x, y; k)] W_{T^{(2)}}^k\right\} \quad (4)$$

Here, a twiddle factor W is defined as in Equation (5).

[Math. 5]

$$W_K^k = \exp\left(-j\frac{2\pi k}{K}\right), \quad (k = 0, 1, \ldots, K - 1) \quad (5)$$

The original moiré fringe phase $\varphi_m$ and the original grating phase $\varphi_s$ can be respectively obtained by Equation (6) and Equation (7) using the phase of the 2nd-order moiré fringes which is obtained here.

[Math. 6]

$$\varphi_m(x) = \varphi_m^{(2)}(x) + 2\pi\frac{x}{T^{(2)}} \quad (6)$$

[Math. 7]

$$\varphi_s(x) = \varphi_m(x) + 2\pi\frac{x}{T} = \varphi_m^{(2)}(x) + 2\pi\frac{x}{T^{(2)}} + 2\pi\frac{x}{T} \quad (7)$$

In this manner, the traditional moiré fringes are regarded as a grating and the sampling moiré method as a spatial phase analysis method is applied, so that it is possible to perform high-accuracy analysis in addition to the original feature of a wide field of view.

Calculation Principle 2 of Phase Distribution of 2nd-Order Moiré Fringes (Case in which Grating Image is Down-Sampled in Two Stages)

FIG. 5 shows the principle of the method of calculating the phase distribution of the second kind of 2nd-order moiré fringes.

Here, the pitch of a one-dimensional grating projected on the surface of the object in the vertical direction or a grating attached to the surface of the specimen is assumed to be P. The intensity distribution of the grating image captured in this case is expressed by Equation (8).

[Math. 8]

$$I(x, y) = a(x, y)\cos\left[2\pi\frac{x}{P} + \varphi_0\right] + b(x, y) \quad (8)$$

Here, a(x,y), b(x,y), and $\varphi_0$ are the amplitude, the background intensity, and the initial phase of the grating, respectively.

When down-sampling and intensity interpolation are performed on the captured grating image at a sampling (camera imaging pixel digital grating) pitch T in the x-direction, phase expressions of the grating and the sampling grating are $\varphi_s = 2\pi x/P$ and $\varphi_r = 2\pi x/T$, respectively.

The intensity of the traditional moiré fringes which is obtained by the sampling moiré method can be expressed by Equation (9) on the assumption that A(x,y) denotes the amplitude of the moiré fringes, $\varphi_0$ denotes an initial phase, and B(x,y) includes the background intensity and high-order frequencies ($2\pi x/P$, $2\pi x (1/P+1/T)$, and the like).

Unlike Equation (1), a plurality of phase-shifted moiré fringes are obtained here at the same time.

[Math. 9]

$$I_m(x, y; t) = A(x, y)\cos\left[2\pi x\left(\frac{1}{P} - \frac{1}{T}\right) + \varphi_0 + 2\pi\frac{t}{T}\right] + B(x, y) \quad (9)$$
$$(t = 0, 1, \ldots, T - 1)$$

These phase-shifted moiré fringes obtained here are treated as "gratings" used for generation of the 2nd-order moiré fringes. When a down-sampling pitch is assumed to be $T^{(2)}$ as down-sampling at the second stage with respect to each of the phase shifting moiré fringes, the intensity distribution of the 2nd-order moiré fringes can be expressed by Equation (10) on the assumption that $A^{(2)}(x,y)$ denotes the amplitude of the 2nd-order moiré fringes, k and t denote the numbers of the phase shifting procedures, and $B^{(2)}(x,y)$ denotes the background intensity of the 2nd-order moiré fringes.

In this case, $T \times T^{(2)}$ phase-shifted 2nd-order moiré fringes are obtained.

[Math. 10]

$$I_m^{(2)}(x, y; t, k) = \quad (10)$$
$$A^{(2)}(x, y)\cos\left[2\pi x\left(\frac{1}{P} - \frac{1}{T} - \frac{1}{T^{(2)}}\right) + \varphi_0 + 2\pi\frac{t}{T} + 2\pi\frac{k}{T^{(2)}}\right] + B^{(2)}(x, y)$$
$$(t = 0, 1, \ldots, T - 1; k = 0, 1, \ldots, T^{(2)} - 1)$$

As a result, the phase of the 2nd-order moiré fringes can be expressed by Equation (11) and calculated by two-dimensional discrete Fourier transform or fast Fourier transform.

[Math. 11]

$$\varphi_m^{(2)}(x) = 2\pi x\left(\frac{1}{P} - \frac{1}{T} - \frac{1}{T^{(2)}}\right) + \varphi_0 \quad (11)$$
$$= \arg\left\{\sum_{k=0}^{T^{(2)}-1}\sum_{t=0}^{T-1} [I_m^{(2)}(x, y; t, k)] W_T^t W_{T^{(2)}}^k\right\}$$

The original moiré fringe phase $\varphi_m$ and the original grating phase $\varphi_s$ can be respectively obtained by Equation (6) and Equation (7) using the phase of the 2nd-order moiré fringes which is obtained here.

In addition, the intensity distribution of the grating image obtained by imaging a one-dimensional grating projected on the surface of the object in an oblique direction or a grating attached to the surface of the specimen by using a digital camera is expressed by Equation (12).

[Math. 12]

$$I(x, y) = a(x, y)\cos\left[2\pi\frac{x}{P_x} + 2\pi\frac{y}{P_y} + \varphi_0\right] + b(x, y) \quad (12)$$

Here, $P_x$ and $P_y$ are pitch intervals of the grating in the x-direction and the y-direction, respectively.

When down-sampling and intensity interpolation are performed on a captured grating image at sampling (camera imaging pixel digital grating) pitches $T_x$ and $T_y$ in the x-direction and the y-direction, respectively, the intensity distribution of the traditional moiré fringes which are obtained by a two-dimensional sampling moiré method can be expressed by Equation (13).

[Math. 13]

$$\begin{aligned}I_m(x, y, t_x, t_y) = & \\ A(x, y)\cos\bigg[2\pi x\bigg(\frac{1}{P_x} - \frac{1}{T_x}\bigg) &+ 2\pi y\bigg(\frac{1}{P_y} - \frac{1}{T_y}\bigg) + \varphi_0 + 2\pi\frac{t_x}{T_x} + \\ & 2\pi\frac{t_y}{T_y}\bigg] + B(x, y) \\ (t_x = 0, 1, \ldots, T_x - 1; & t_y = 0, 1, \ldots, T_y - 1)\end{aligned} \quad (13)$$

These phase-shifted moiré fringes obtained here are treated as "gratings" used for generation of the 2nd-order moiré fringes.

When down-sampling pitches in the x-direction and the y-direction are assumed to be $T_x^{(2)}$ and $T_y^{(2)}$ as down-sampling at the second stage with respect to each of the phase shifting moiré fringes, the intensity distributions of these phase-shifted 2nd-order moiré fringes can be expressed by Equation (14) on the assumption that $A^{(2)(x,y)}$ denotes the amplitude of the 2nd-order moiré fringes, $k_x$ and $k_y$ denote the numbers of the phase shifting procedures in the x-direction and the y-direction, respectively, and $B^{(2)(x,y)}$ is the background intensity of the 2nd-order moiré fringes.

[Math. 14]

$$\begin{aligned}I_m^{(2)}(x, y; t_x, t_y, k_x, k_y) = & \\ A^{(2)}(x, y)\cos\bigg[2\pi x\bigg(\frac{1}{P_x} - \frac{1}{T_x} - \frac{1}{T_x^{(2)}}\bigg) &+ 2\pi y\bigg(\frac{1}{P_y} - \frac{1}{T_y} - \frac{1}{T_y^{(2)}}\bigg) + \\ \varphi_0 + 2\pi\frac{t_x}{T_x} + 2\pi\frac{t_y}{T_y} + 2\pi\frac{k_x}{T_x^{(2)}} &+ 2\pi\frac{k_y}{T_y^{(2)}}\bigg] + B^{(2)}(x, y) \\ (t_x = 0, 1, \ldots, T_x - 1; t_y = 0, 1, \ldots, & T_y - 1; k_x = 0, \\ 1, \ldots, T_x^{(2)} - 1; k_y = 0, 1, & \ldots, T_y^{(2)} - 1)\end{aligned} \quad (14)$$

The phase of the 2nd-order moiré fringes can be calculated by (multidimensional) discrete Fourier transform or fast Fourier transform as shown in Equation (15).

[Math. 15]

$$\begin{aligned}\varphi_m^{(2)}(x) = 2\pi x\bigg(\frac{1}{P_x} - \frac{1}{T_x} - \frac{1}{T_x^{(2)}}\bigg) &+ 2\pi y\bigg(\frac{1}{P_y} - \frac{1}{T_y} - \frac{1}{T_y^{(2)}}\bigg) + \varphi_0 = \\ \arg\bigg\{\sum_{k_x=0}^{T_x^{(2)}-1}\sum_{k_y=0}^{T_y^{(2)}-1}\sum_{t_x=0}^{T_x-1}\sum_{t_y=0}^{T_y-1} & [I_m^{(2)}(x, y; t_x, t_y, k_x, k_y)] \\ & W_{T_x}^{t_x} W_{T_y}^{t_y} W_{T_x^{(2)}}^{k_x} W_{T_y^{(2)}}^{k_y}\bigg\}\end{aligned} \quad (15)$$

The original moiré fringe phase $\varphi_m$ and the original grating phase $\varphi_s$ can be respectively obtained by Equation (6) and Equation (7) using the phase of the 2nd-order moiré fringes which is obtained here.

Calculation Principle 3 of Phase Distribution of 2nd-Order Moiré Fringes (Method of Adjusting Pitch of Moiré Fringes after Grating Image is Down-Sampled)

FIG. 6 shows the principle of the method of calculating the phase distribution of the third kind of 2nd-order moiré fringes after adjusting the pitch interval of the traditional moiré fringes In the 2nd-order moiré method according to the present invention, moiré fringes generated by first down-sampling are regarded as a grating and down-sampling processing is performed again. However, in the case in which the pitch interval between the moiré fringes is sparse, a down-sampling pitch of 2nd-order moiré fringes becomes large, and a spatial resolution may be reduced.

In this case, a method capable of adjusting the pitch of the moiré fringes using the phase value of the moiré fringes will be described below so that the second down-sampling processing can be performed at an appropriate pitch interval.

In the sampling moiré method, it is possible to generate dense (multiplied) moiré fringes by performing down-sampling and intensity interpolation processing at a pitch T close to the grating pitch P and using a sine wave or cosine wave function of a value obtained by multiplying a phase value of obtained sparse moiré fringes by N which is an integer shown in Equation (16) again.

[Math. 16]

$$I_m^{(2)}(x,y)=\sin[N\varphi_m(x,y)] \text{ or } \cos[N\varphi_m(x,y)] \quad (16)$$

When the 2nd-order moiré fringes are generated at a down-sampling pitch of a value close to an interval between adjusted moiré fringes obtained by this method and are applied to the 2nd-order moiré fringe phase calculation method having been described above, phase analysis for the 2nd-order moiré fringes can be performed with high accuracy.

In this method, it is advantageous to selectively determine whether accuracy is prioritized or a spatial resolution is prioritized by changing N which is an adjustment factor.

Table 1 shows comparison between features and application conditions of the three techniques according to the present invention which have been described above and traditional phase analysis methods. An optimum method is selectable depending on whether the grating itself to be recorded or the interval between moiré fringes is dense or sparse. Table 2 shows comparison between the traditional methods and the present invention in measurement of the three-dimensional shape and the out-of-plane displacement, and Table 3 shows comparison between several traditional methods and the present invention in measurement of the in-plane displacement and strain.

As compared with the traditional methods, it is possible to measure the shape and deformation with high accuracy and at high speed or with high accuracy and a wide field of view.

[Math. 17]

$$z = \kappa(\varphi_{object} - \varphi_{ref}) = \kappa \cdot \Delta\varphi \tag{17}$$

TABLE 1

Application conditions of the proposed three kinds of 2nd-order moiré techniques

| Proposed techniques | Application conditions | | | | | | |
|---|---|---|---|---|---|---|---|
| | When recorded image is grating | When recorded image is moiré | When traditional moiré is dense | When traditional moiré is sparse | High accuracy | High speed | Large view field |
| Basic 2nd-order moiré | ○ | ○ | ○ | Δ | ○ | ◎ | ○ |
| Multiple spatial phase shifting + 2nd-order moiré | ○ | X | ○ | Δ | ◎ | Δ | Δ |
| Moiré spacing adjustment + 2nd-order moiré | ○ | ○ | Δ | ○ | ◎ | ○ | ○ |

TABLE 2

Comparison of different moiré techniques for 3D shape and out-of-plane displacement measurement

| | | High accuracy | Dynamic measurement from a single image | High spatial resolution |
|---|---|---|---|---|
| Traditional techniques | Projection moiré | Δ | ○ | Δ |
| | Temporal phase-shifting moiré | ○ | X | ○ |
| | Sampling moiré | Δ | ○ | ○ |
| | Temporal-spatial phase-shifting moiré | ◎ | X | ○ |
| Proposed technique | 2nd-order moiré | ◎ | ○ | Δ |

TABLE 3

Comparison of different moiré techniques for in-plane displacement and strain measurement

| | | High accuracy | Dynamic deformation | Large view field | High spatial resolution |
|---|---|---|---|---|---|
| Traditional techniques | Scanning moiré | Δ | Δ | ○ | Δ |
| | Moiré interferometry | Δ | ○ | ◎ | ○ |
| | Sampling moiré | ○ | ○ | Δ | ○ |
| | Digital/overlapping moiré | Δ | ○ | Δ | Δ |
| | Temporal phase-shifting moiré | ○ | X | ○ | ○ |
| Proposed technique | 2nd-order moiré | ◎ | ○ | ○ | Δ |

Principle of Measurement of Three-Dimensional Shape of Object Using 2nd-Order Moiré Fringes As an example of the method of measuring an object, for example, grating projection and imaging are performed on the reference surface which is a planar object. The phase distribution of the reference surface is assumed to be $\varphi_{ref}$. In addition, grating projection and imaging are performed on the object installed in front of the reference surface and the phase distribution of the object is assumed to be $\varphi_{object}$. Here, the relationship between the phase difference of the reference surface and the object and the height of the object is approximately proportional as shown in Equation. (17).

Therefore, when the phase-to-height conversion factor κ is obtained by calibrating the relation between a distance (height) at each of two locations and the phase difference at that time while moving the reference surface to several locations in advance in the depth (height) direction, it is possible to measure the height of the object in a non-contact manner.

Principle of Measurement of Deformation (Displacement and Strain Distribution) Using 2nd-Order Moiré Fringes When an external force (force, a thermal change, or the like) is loaded to deform a structural material, the pitch of a grating on the surface of the specimen changes from P to P' in the x-direction due to deformation.

In the case in which the pitch of the reference grating T does not change, the moiré fringe phase after deformation is as shown in Equation (18), similar to Equation (2).

[Math. 18]

$$\varphi_{m'}(x) = 2\pi x\left(\frac{1}{P'} - \frac{1}{T}\right) + \varphi_0 \tag{18}$$

When the pitch of a specimen grating changes from P to P', the phase of the specimen grating of the specimen changes to $\varphi_s = 2\pi y/P'$, and thus the phase difference between the specimens before and after deformation is as shown in Equation (19).

[Math. 19]

$$\Delta\varphi_s(x) = 2\pi x\left(\frac{1}{P'} - \frac{1}{P}\right) \quad (19)$$

As seen from Equations (2), (18), and (19), the phase difference between the traditional moiré fringes is equal to the phase difference between the specimen gratings before and after deformation.

[Math. 20]

$$\Delta\varphi_m(x) = \varphi_{m'}(x) - \varphi_m(x) = 2\pi x\left(\frac{1}{P'} - \frac{1}{P}\right) = \Delta\varphi_s(x) \quad (20)$$

With the deformation, in the case in which the pitch of the specimen grating changes from P to P' in the x-direction due to deformation and the pitch of the reference grating $T^{(2)}$ does not change, the 2nd-order moiré fringes after deformation is as shown in Equation (21), similar to Equation (4).

[Math. 21]

$$\varphi_{m'}^{(2)}(x) = 2\pi x\left(\frac{1}{P'} - \frac{1}{T} - \frac{1}{T^{(2)}}\right) + \varphi_0 \quad (21)$$

It can be seen that the phase difference between the 2nd-order moiré fringes is equal to the phase difference between the traditional moiré fringes before and after deformation and the phase difference between the specimen gratings before and after deformation.

[Math. 22]

$$\Delta\varphi_m^{(2)}(y) = \varphi_{m'}^{(2)}(y) - \varphi_m^{(2)}(y) = 2\pi y\left(\frac{1}{P'} - \frac{1}{P}\right) = \Delta\varphi_m(y) = \Delta\varphi_s(y) \quad (22)$$

Assuming that u expresses the displacement of the specimen grating in the x-direction, the phase of the deformed specimen grating can be expressed as $\varphi_s'(x) = 2\pi(x-u)/P$.

The phase difference between the specimen gratings can be calculated by $\Delta\varphi_s(x) = \varphi_s'(x) - \varphi_s(x) = -2\pi u/p$ on the basis of the phase $\varphi_s(x) = 2\pi x/p$ of the specimen grating before deformation. As a result, the displacement is proportional to the phase difference between the specimen gratings.

Here, p is the actual pitch of the grating on the specimen surface.

The displacement of the specimen in the x-direction is determined by Equation (23).

[Math. 23]

$$u_x = -\frac{p}{2\pi}\Delta\varphi_s(x) = -\frac{p}{2\pi}\Delta\varphi_m^{(2)}(x) \quad (23)$$

The strain of the specimen in the x-direction can be measured from the first derivative of the displacement $u_x$.

[Math. 24]

$$\varepsilon_x = \frac{\partial u_x}{\partial x} \quad (24)$$

Similarly, in the case in which the pitch of the grating in the y-direction is p, measurement of the displacement and strain in the y-direction can be calculated by Equation (25) and Equation (26).

[Math. 25]

$$u_y = -\frac{p}{2\pi}\Delta\varphi_s(y) = -\frac{p}{2\pi}\Delta\varphi_m^{(2)}(y) \quad (25)$$

[Math. 26]

$$\varepsilon_y = \frac{\partial u_y}{\partial y} \quad (26)$$

First Embodiment: Measurement of Three-Dimensional Shape

Hereinafter, the first embodiment of the present invention will be described with reference to the accompanying drawings.

FIG. 7 is a diagram showing an example of arrangement of a computer 1, an imaging sensor 3, a grating projection device 4, a measurement target 5, and a reference surface (planar object) 6 in a three-dimensional shape measurement system for an object according to the present embodiment.

In the example shown in FIG. 7, the three-dimensional shape measurement system measures the shape of a three-dimensional object as a measurement target.

A grating pattern which is set from a grating projection control unit 11 (The pitch and the height factor (conversion factors for the phase difference and the height of a regular grating) on a reference surface are known) is projected by the grating projection device 4, and the grating pattern of the projected pattern which is distorted in accordance with the shape of the object is imaged by a fringe grating image storage unit 12 using the imaging sensor 3 (any of various cameras or microscopes).

With respect to the captured image, the phase distribution of the 2nd-order moiré fringe image is calculated by a 2nd-order moiré fringe generation unit and phase analysis arithmetic operation unit 13 using the method according to the present invention, and the height distribution is further calculated from the phase distribution by a three-dimensional shape arithmetic operation unit 14.

Measurement results thereof are displayed on a monitor display unit 2.

Second Embodiment: Measurement of Displacement and Strain

FIG. 8 is a diagram showing an example of arrangement of a computer 1, an imaging sensor 3, a structural material 7 as the measurement target, and a minute grating 8 (one-dimensional or two-dimensional) in a displacement and strain distribution measurement system for the material according to the present embodiment.

In the example shown in FIG. 8, the deformation measurement system records the grating image or moiré fringes of a minute grating which is imparted to the surface of the structural material as the measurement target and of which the pitch is known by using the imaging sensor 3.

The impartation may not only be attachment of a regular grating to the surface of the material but also be a repetitive pattern which exists on the specimen surface in advance, for example, as seen in an atomic array image observed in a metal material.

Moiré fringes recorded in the storage unit 12 or moiré fringes generated from a grating image are processed by the 2nd-order moiré fringe generation unit and phase analysis arithmetic operation unit 13. The displacement and strain distribution results measured by a displacement and strain arithmetic operation unit 15 are further displayed on a monitor 2.

Shape Deformation Measurement Procedure

FIG. 9 is a flowchart showing measurement of the shape and deformation which is performed by the 2nd-order moiré method.

(S1) In the case of measurement of the three-dimensional shape, a grating pattern is projected on the surface of the object.

In the case of measurement of displacement and strain distributions, a regular grating manufactured on the specimen surface, or a periodic structure of the specimen itself can be set to be a grating.

(S2) Next, the specimen grating is disposed under an image recording device.

The image recording device may be a scanning microscope such as a laser scanning microscope (LSM), a scanning electron microscope (SEM), a transmission electron microscope (TEM), or an atomic force microscope (AFM), a digital camera such as a charge coupled device (CCD) camera or a complementary metal oxide semiconductor (CMOS) camera, or a moiré interferometer.

Next, the scanning line interval of a microscope or the pixel size of a camera is adjusted to the vicinity of the specimen grating pitch (or an integral multiple thereof (a natural number of 2 or greater) or a fractional multiple with an integer as a denominator).

Microscope or CCD/CMOS moiré fringes are recorded in a wide field of view in the image recording device by interference between the specimen grating and a microscope scanning line or a pixel array.

Alternatively, interference moiré fringes generated by two coherent laser interferences are recorded by an interferometer.

Microscope moiré, CCD/CMOS moiré, and interference moiré are techniques for directly observing and recording moiré fringes.

In addition to this, there are methods of capturing a grating image and generating moiré fringes (for example, digital moiré, sampling moiré, overlapped moiré, and the like) by image processing.

In these techniques, the specimen grating pitch on a captured image can be reduced to less than two pixels in order to enlarge a field of view.

Moiré fringes obtained by the sampling moiré method or the digital moiré method are generated by interference between down-sampling and intensity interpolation or between the specimen grating and a digital grating close to the pitch (or an integral multiple or a fractional multiple) of the specimen grating. Overlapped (geometric) moiré fringes are generated by overlapping between specimen gratings before and after deformation.

(S3) Phase-shifted 2nd-order moiré fringes are generated by down sampling, intensity interpolation, and spatial phase shifting by using these traditional moiré fringes and a pitch close to the interval therebetween.

Then, it is possible to obtain the phase distribution of 2nd-order moiré fringes from the phase-shifted 2nd-order moiré fringes.

(S5) It is possible to accurately perform quantitative evaluation of (S4) displacement and strain distributions with a wide field of view from the phase difference between 2nd-order moiré fringes before and after deformation.

This shape deformation measurement method is referred to as the 2nd-order moiré method.

The 2nd-order moiré method can be extended in multiple stages as long as moiré fringes having the same phase difference can be generated using digital gratings.

Accordingly, the 2nd-order moiré method includes a multistage moiré method to the extent that the method conforms to the problem of the present invention.

In the case in which moiré fringes before deformation can be estimated by comparing the change in the phase (phase gradient) of moiré fringes of an undeformed portion and the change in the phase of moiré fringes of a deformed portion with each other from only one moiré fringe pattern after deformation, it is also possible to obtain the strain from one moiré fringe pattern after deformation.

The 2nd-order moiré method may be applied using moiré fringes estimated at the time of obtaining the change in the phase of the moiré fringes and moiré fringes after deformation as moiré fringes before and after deformation.

However, this technique is unsuitable in the case in which a distorted grating pattern on a reference surface is imaged because a grating is obliquely projected onto an object in the measurement of the three-dimensional shape described in the first embodiment shown in FIG. 7, except for the case in which a regular grating image (which would have been obtained in the case of the reference surface) on the reference surface is estimated from the distorted grating image.

Flow of Program of the Present Invention

Next, the shape deformation measurement process according to the present invention will be described. FIG. 10 is a flowchart showing a shape deformation measurement process according to the present invention. The process shown in FIG. 10 includes steps S101, S102, S103, S104, and S105.

In the process shown in FIG. 10, the processing of step S105 is performed in a sequential order after step S101.

A program language can be appropriately selected as long as the above-described equations can be arithmetically operated, and a computer for executing the program may be either a special-purpose machine or a general-purpose machine.

After the grating pattern or moiré fringes are recorded (S101), parameters such as pitch dimensions, the height factor, and an integer for generating moiré fringes are input (S102), a necessary arithmetic operation is performed using the 2nd-order moiré method (S103), the amounts of the shape, displacement, or strain is calculated from a phase component of 2nd-order moiré fringes (S104), and results thereof are displayed (S105).

Advantageous Effects of Invention

According to the present invention, it is possible to measure the full-field displacement and strain distributions with a wide field of view and a high level of measurement accuracy or dynamically with high accuracy by the 2nd-order moiré method, and thus the following effects are exerted (FIG. 11).

Effect 1: The proposed technique prominently improves measurement accuracy through phase analysis as compared to the microscope moiré method, the CCD moiré method, the digital moiré method, the overlapped moiré method, and the fringe centering method used for moiré interferometry. The strain sensitivity is theoretically $10^{-6}$. In addition, according to the present invention, it is possible to eliminate strain measurement errors caused by scanning distortion of various microscopes.

Effect 2: An analysis region in the proposed technique can be expanded by several tens to several hundred times as compared to the sampling moiré method, the digital moiré method, and the overlapped moiré method.

Effect 3: Only a single moiré pattern or a single grating image is required to be recorded for deformation measurement.

The proposed technique is suitable for a dynamic material test in which the spatiotemporal phase shifting method cannot be applied.

Effect 4: This technique has good noise-resistance characteristics and can be used for measurement of nanoscale to meter scale non-destructive deformation in the case in which a moiré pattern or a grating image can be recorded.

DESCRIPTION OF EMBODIMENTS

Example 1

Confirmation of Principle of Generation of 2nd-Order Moiré Fringes of any Repetitive Pattern Obtained by Simulation Here, effects in the case in which a 2nd-order moiré method is applied to any two-dimensional repetitive pattern are described.

Figure 12:
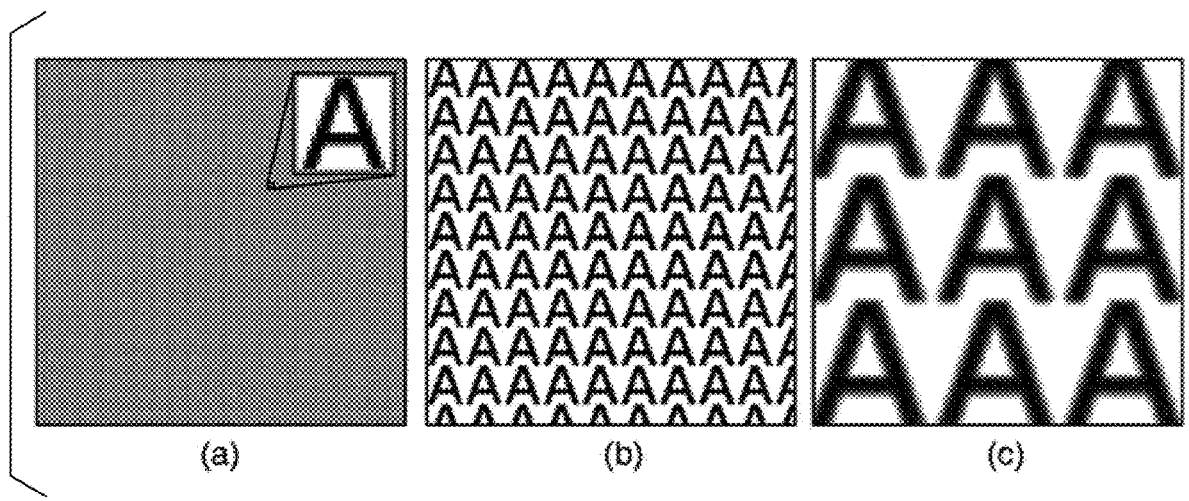
FIG. 12 shows an example in which the 2nd-order moiré method is applied to any two-dimensional repetitive patterns.

FIG. 12($a$) shows a repetitive pattern (an alphabetical character A) which exists or is fabricated on the surface of an object.

FIG. 12($b$) shows the moiré fringe image obtained by performing first down-sampling on the pattern shown in FIG. 12($a$) at a fixed pitch in the x-direction and the y-direction.

This moiré fringe image is regarded as a grating, and FIG. 12($c$) shows the moiré fringe image obtained by further performing second down-sampling on the moiré fringe image at a fixed pitch in the x-direction and the y-direction.

It can be understood that the original repetitive pattern A is further enlarged.

This is called 2nd-order moiré.

Example 2

Confirmation of Principle of Generation of Multiplication Type Moiré Fringes Obtained by Simulation In the present invention, the interval between moiré fringes obtained by performing down-sampling processing on a grating image may be large.

In this case, it is possible to reconfigure multiplication type moiré fringes in which the interval between moiré fringes becomes small so that an appropriate interval between moiré fringes is obtained by the third method according to the present invention.

Figure 13:
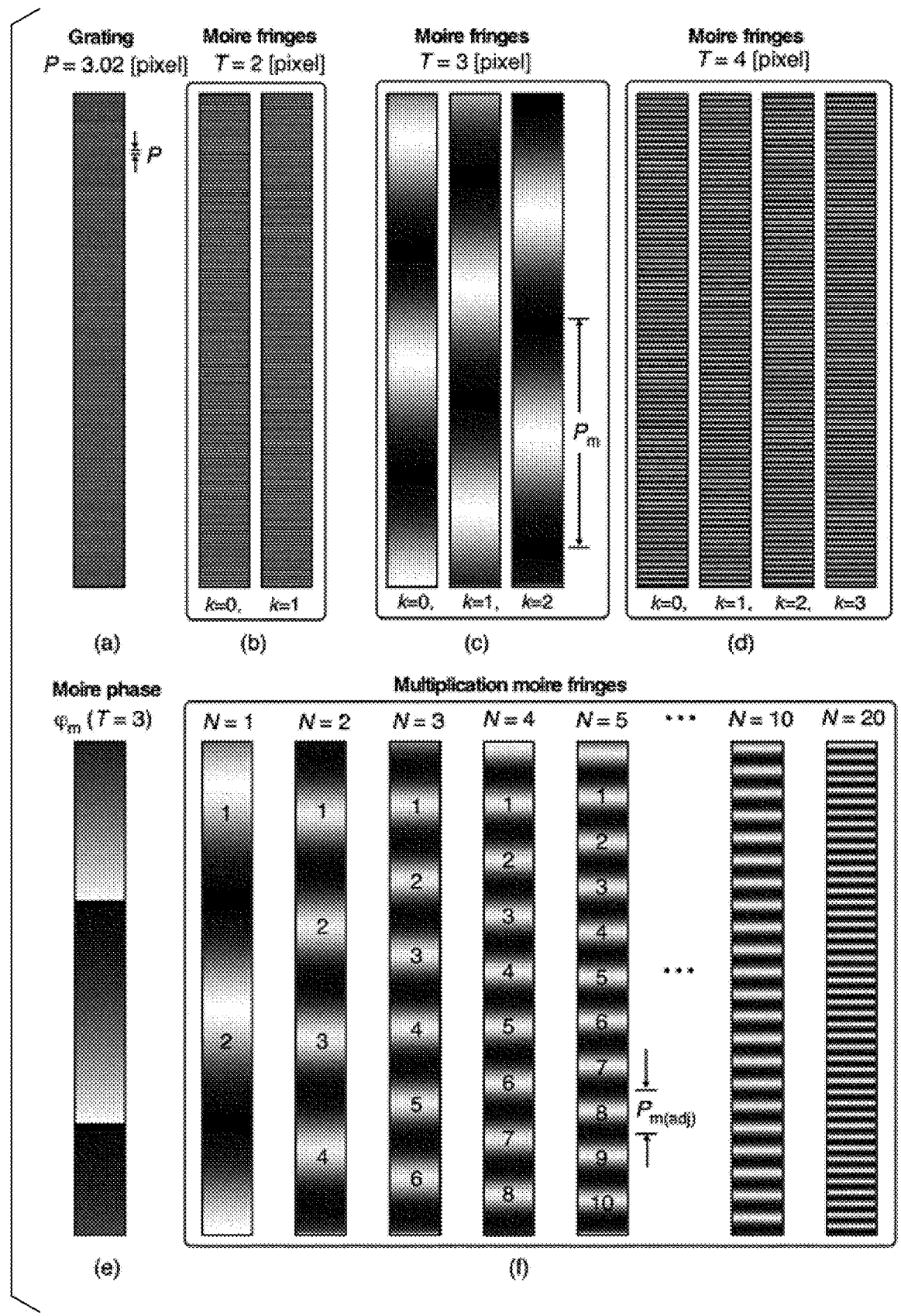
FIG. 13 shows an example in which multiplication type moiré fringes are generated by the third method according to the present invention.

FIG. 13 shows results of generation of (multiplication type) moiré fringes by simulation.

FIG. 13(a) shows a grating pattern having a pitch interval of 3.02 pixels generated by the simulation.

FIG. 13(b) shows two phase-shifted moiré fringe images obtained by performing thinning processing on a grating image of FIG. 13(a) with a down-sampling pitch of 2 pixels.

Since the grating pitch P (3.02 pixels) is greatly different from the sampling pitch T (2 pixels), it can be confirmed that moiré fringes cannot be generated.

FIG. 13(c) shows three phase-shifted moiré fringe images obtained by performing thinning processing on the grating image of FIG. 13(a) with a down-sampling pitch of 3 pixels.

Since the grating pitch P (3.02 pixels) and the sampling pitch T (3 pixels) are close to each other, distinct moiré fringes can be generated, but it can be understood that the interval between the moiré fringes is large.

The application of the 2nd-order moiré method in this situation results in a problem in that the spatial resolution is significantly decreased.

FIG. 13(d) shows four moiré fringe images generated when the number of thinning out for shifting four phases obtained by thinning out the grating image of FIG. 13(a) with a down-sampling pitch of 4 pixels.

Similarly to FIG. 13(b), since the grating pitch P (3.02 pixels) and a sampling pitch T (4 pixels) are greatly different from each other, it can be understood that moiré fringes cannot be generated.

FIG. 13(e) shows a phase distribution image of moiré fringes calculated using the moiré fringe image (FIG. 13(c)) generated when the sampling pitch is 3 pixels.

FIG. 13(f) shows results of the moiré fringe image reconfigured (multiplication type) in the case in which the adjustment factor N is changed from 1 to 20 by using the phase distribution image.

In this manner, it is possible to adjust the interval between moiré fringes from a sparse state to a dense state by changing the adjustment factor N.

Example 3

Verification of Non-Contact Measurement Experiment of Three-Dimensional Shape of Object which is Performed by Grating Projection Method Effects of the improvement in the accuracy of non-contact measurement of the three-dimensional shape of an object which is performed by the 2nd-order moiré method proposed in the present invention are confirmed through an experiment.

Figure 1:
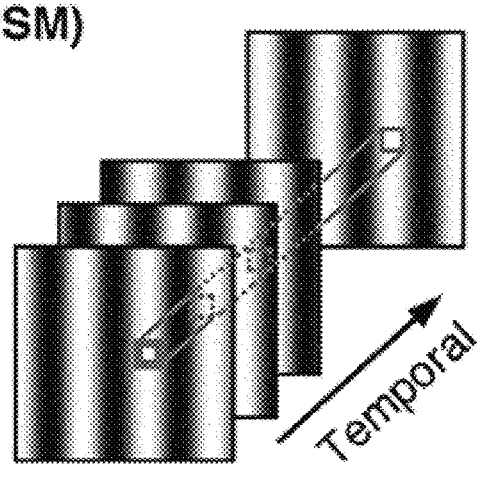
FIG. 1 is a diagram showing principles of different phase analysis techniques.
Figure 1:
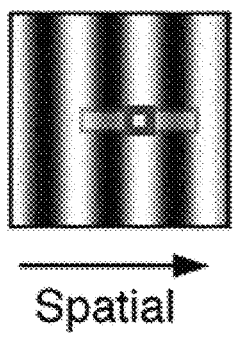
Figure 1:
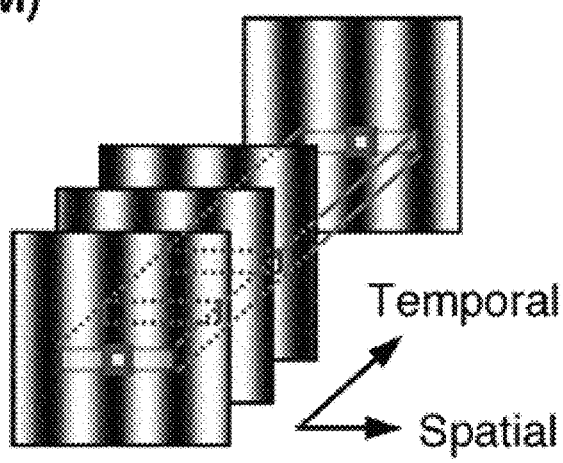
Figure 2:
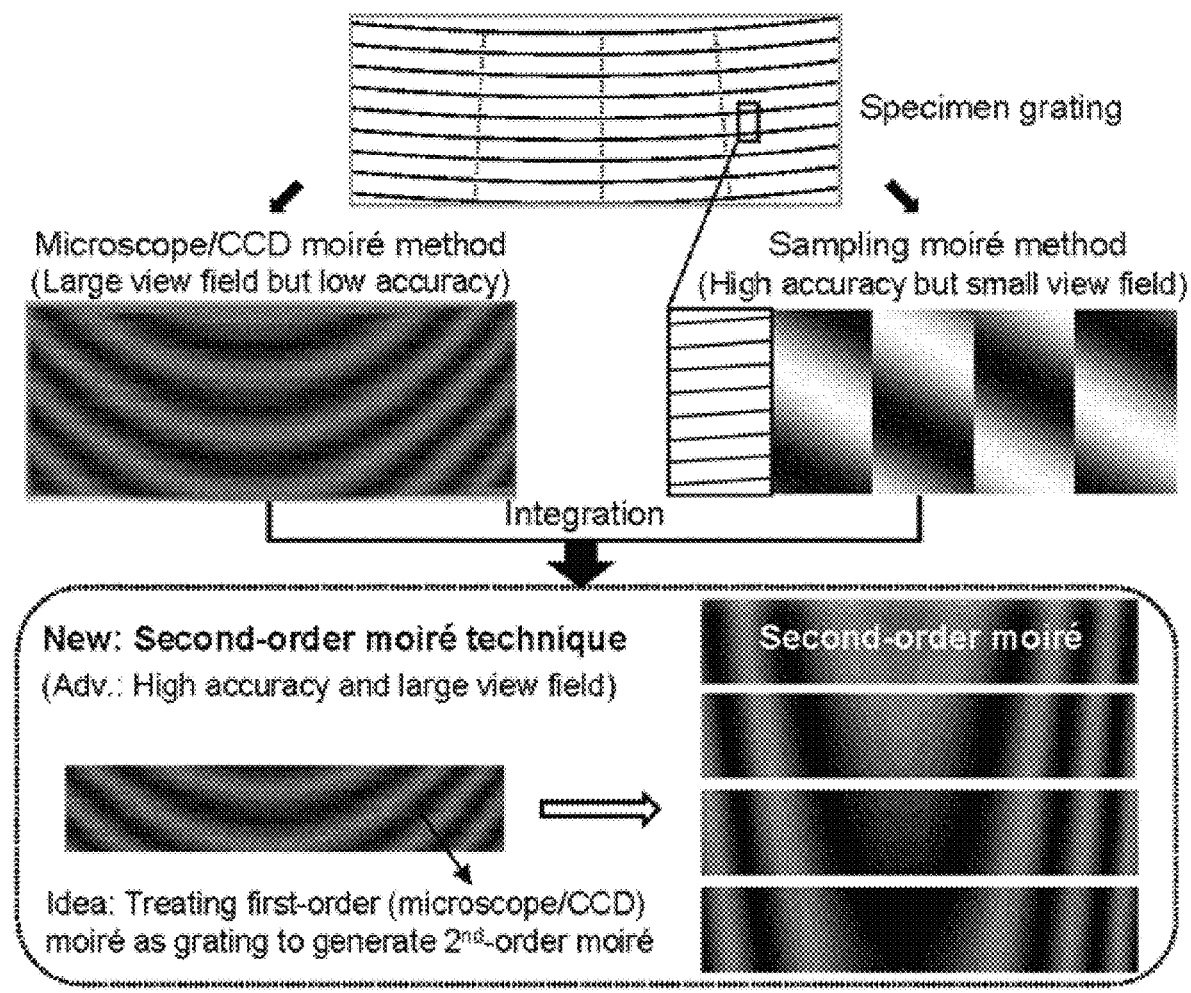
FIG. 2 shows fields of view in different moiré methods.
Figure 3:
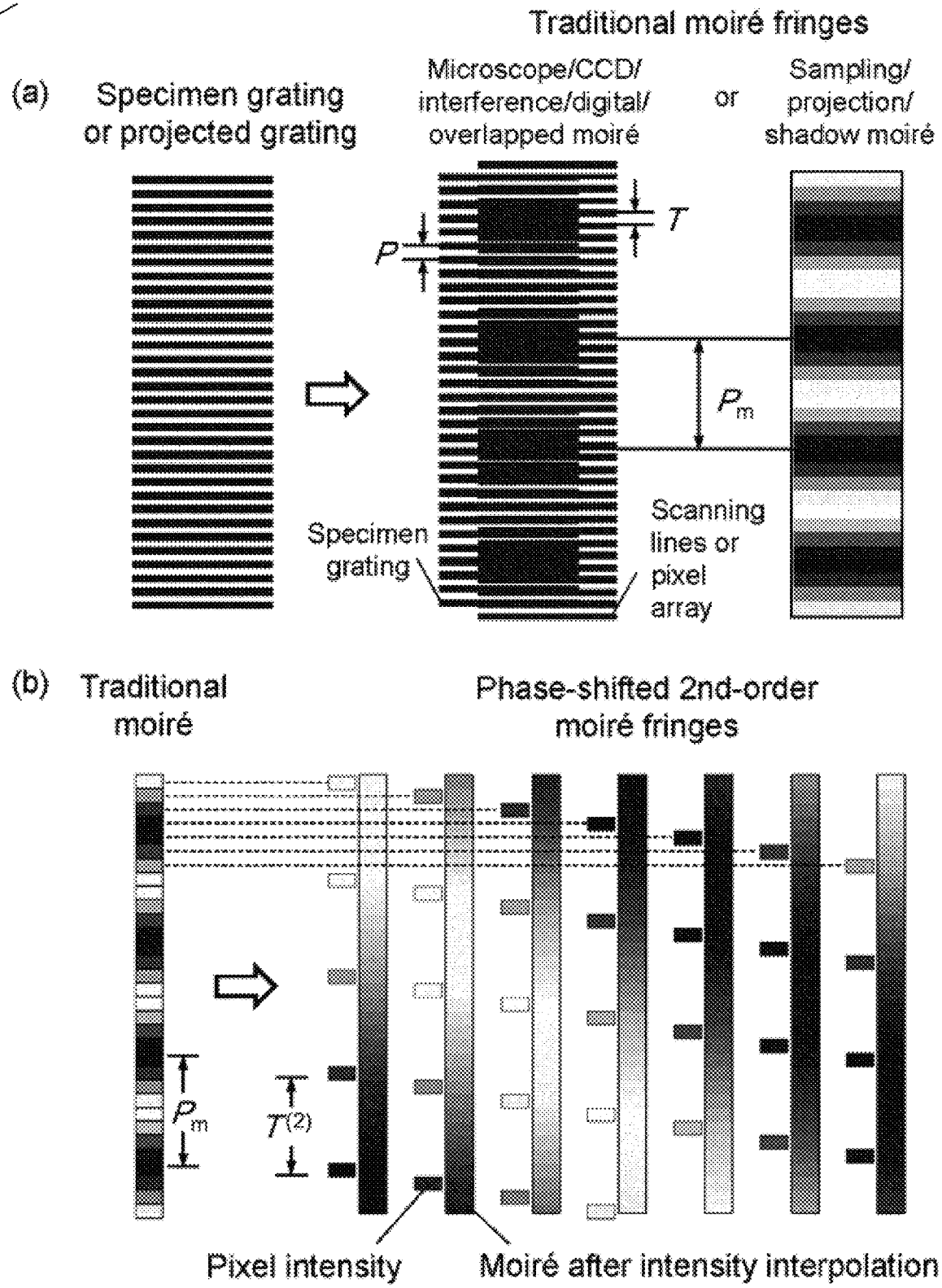
FIG. 3($a$) is a diagram showing traditional moiré fringes, and FIG. 3($b$) is a diagram showing the principle of formation of the 2nd-order moiré fringes.
Figure 4:
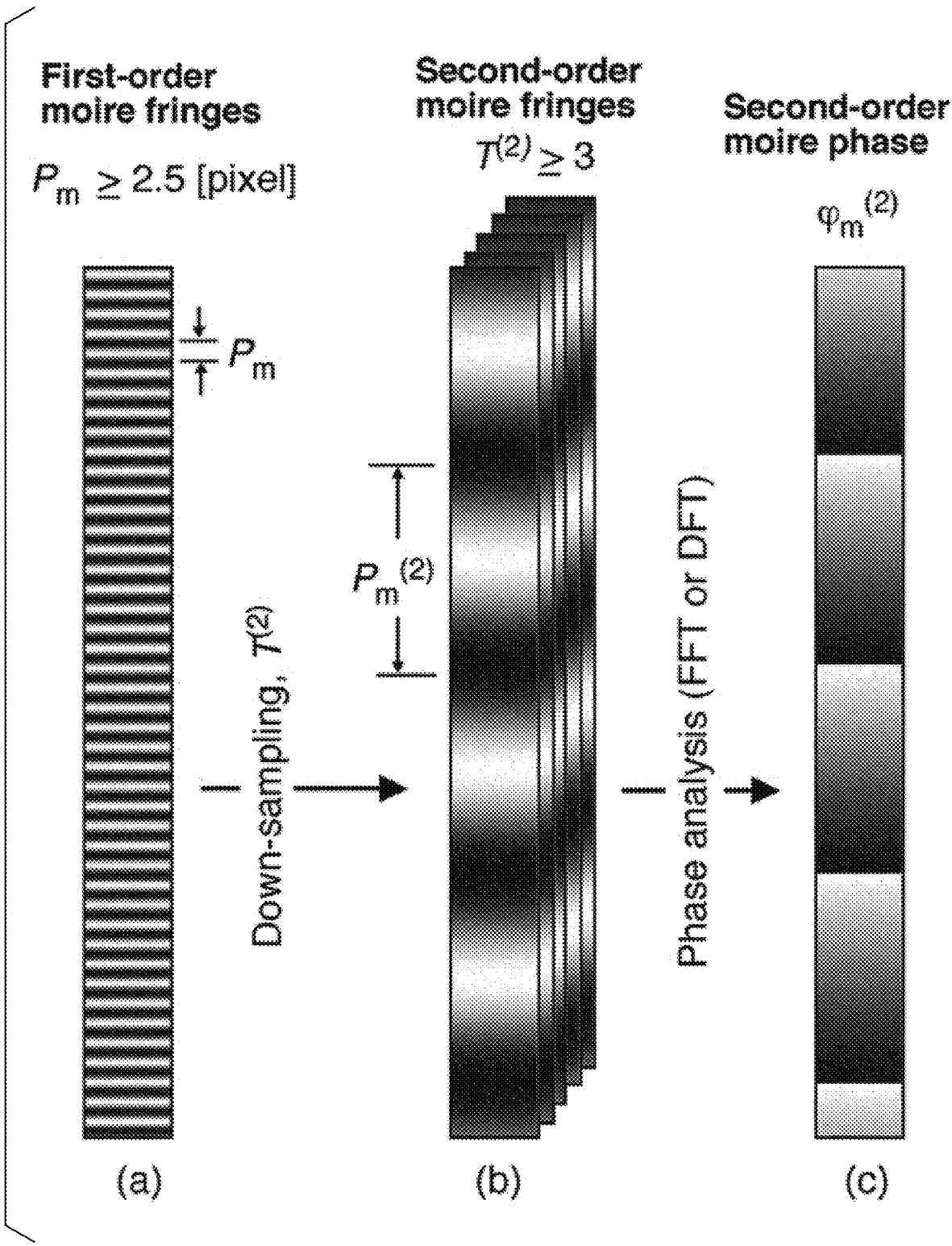
FIG. 4 is a diagram showing the principle of calculation of the phase distribution of the obtained 2nd-order moiré fringes by performing down-sampling processing on a moiré fringe pattern.
Figure 5:
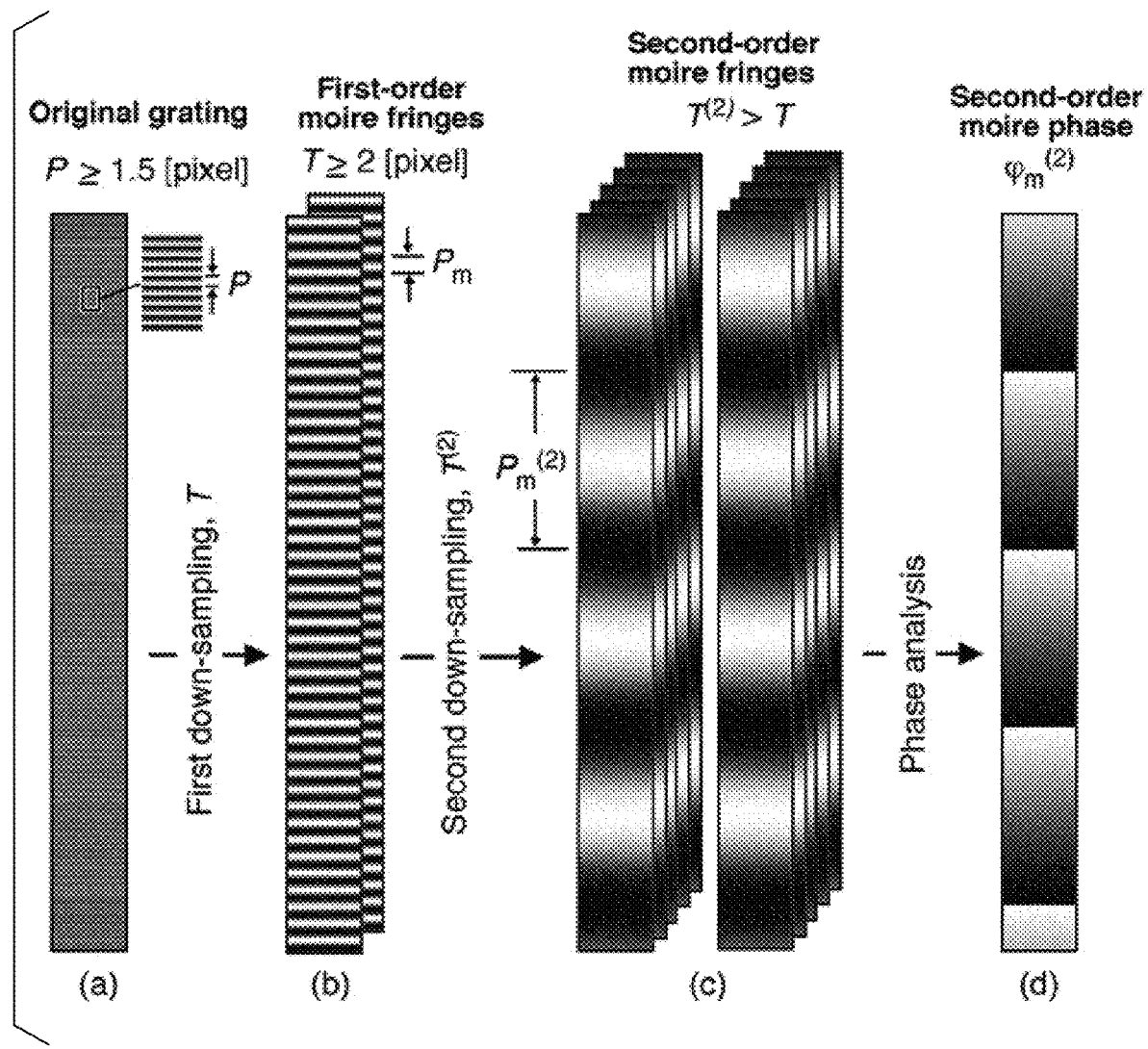
FIG. 5 is a diagram showing the principle of calculation of the phase distribution of the obtained 2nd-order moiré fringes by performing down-sampling processing on a grating image in two stages.
Figure 6:
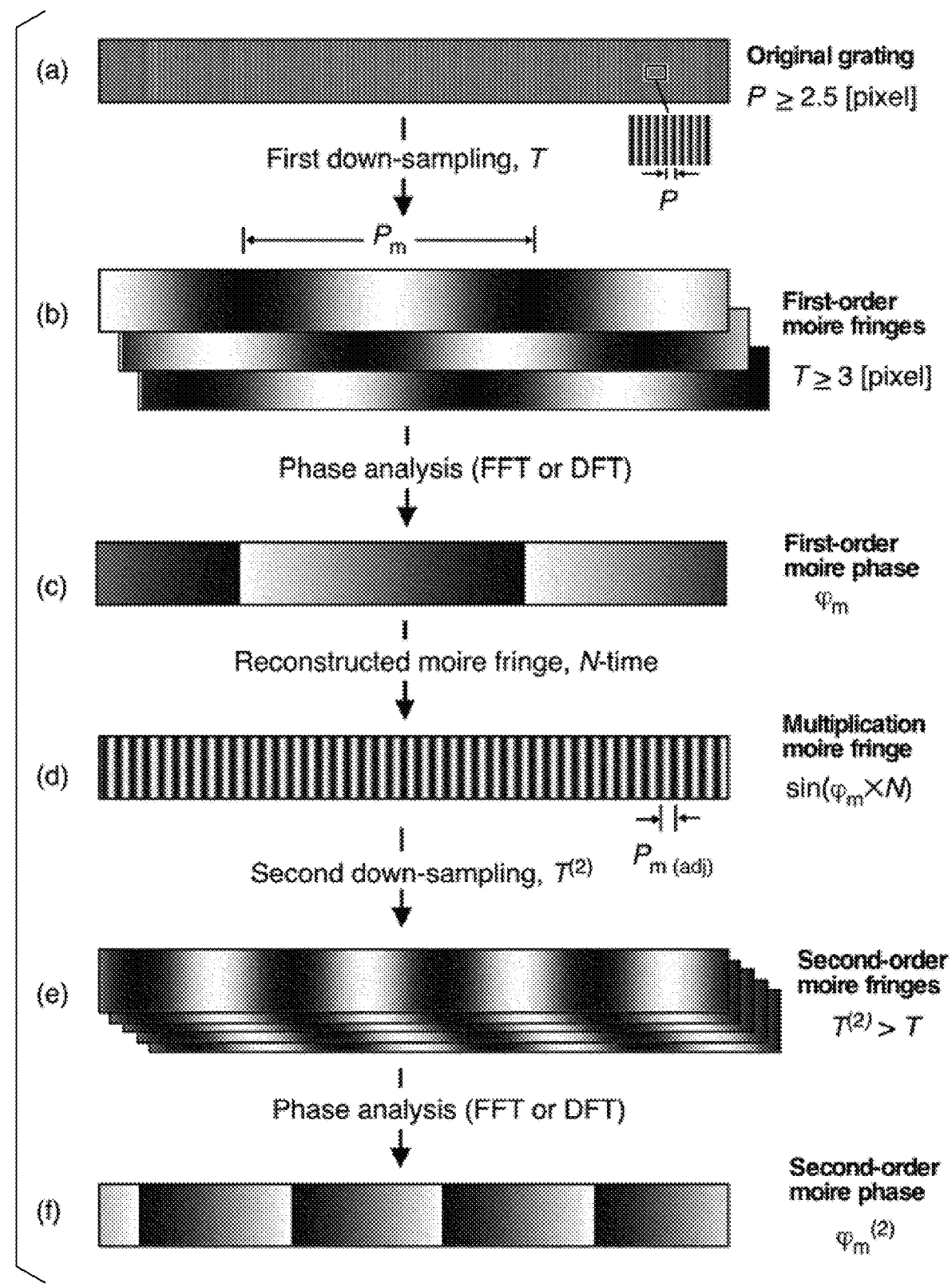
FIG. 6 is a flow diagram showing the principle of generation of multiplication type moiré fringes using a phase distribution and imaging processing.
Figure 7:
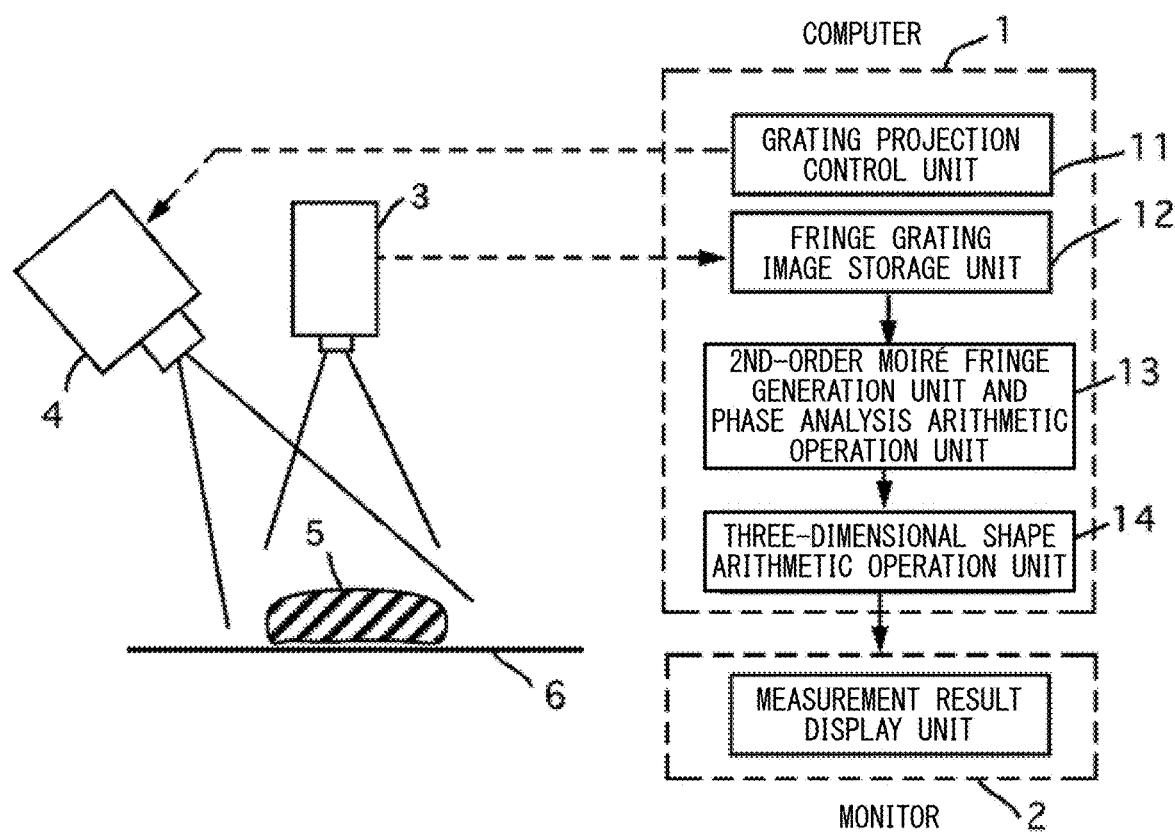
FIG. 7 is a configuration diagram of the three-dimensional shape measurement device according to the present invention.
Figure 8:
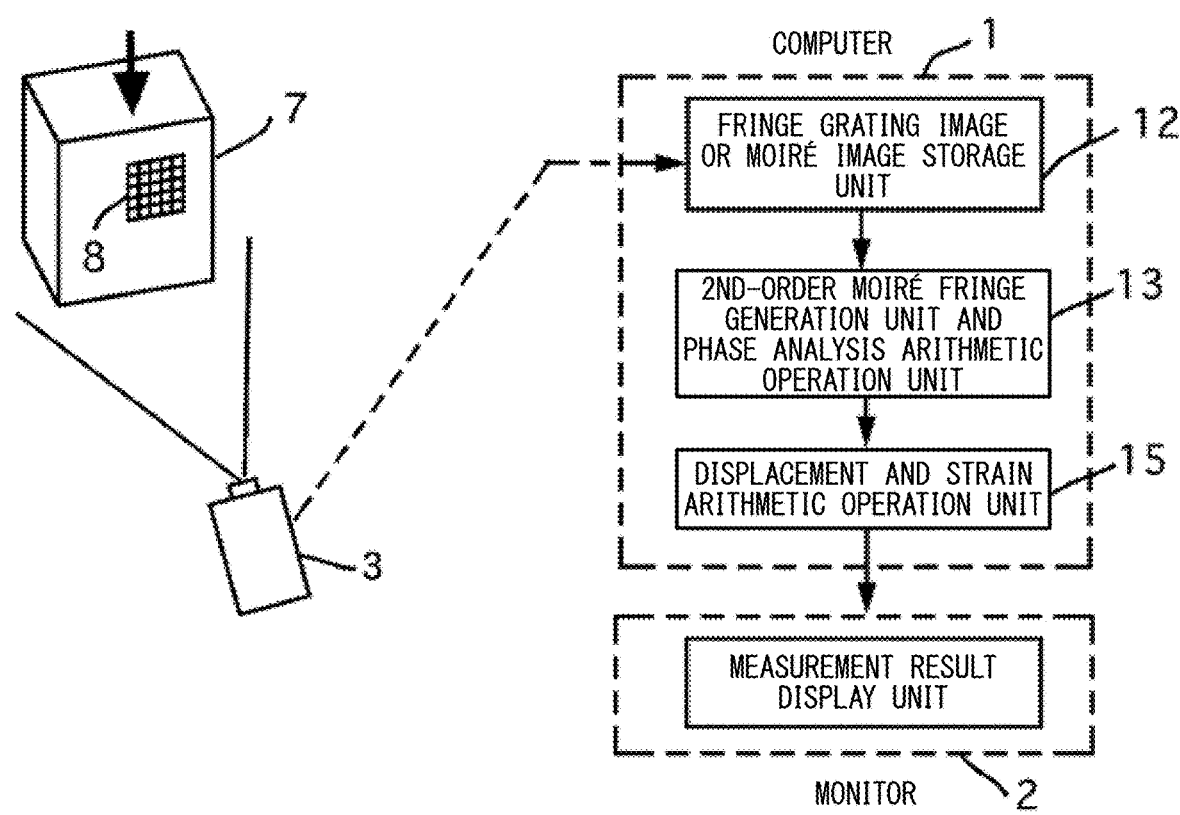
FIG. 8 is a configuration diagram of a displacement and strain measurement device according to the present invention.
Figure 9:
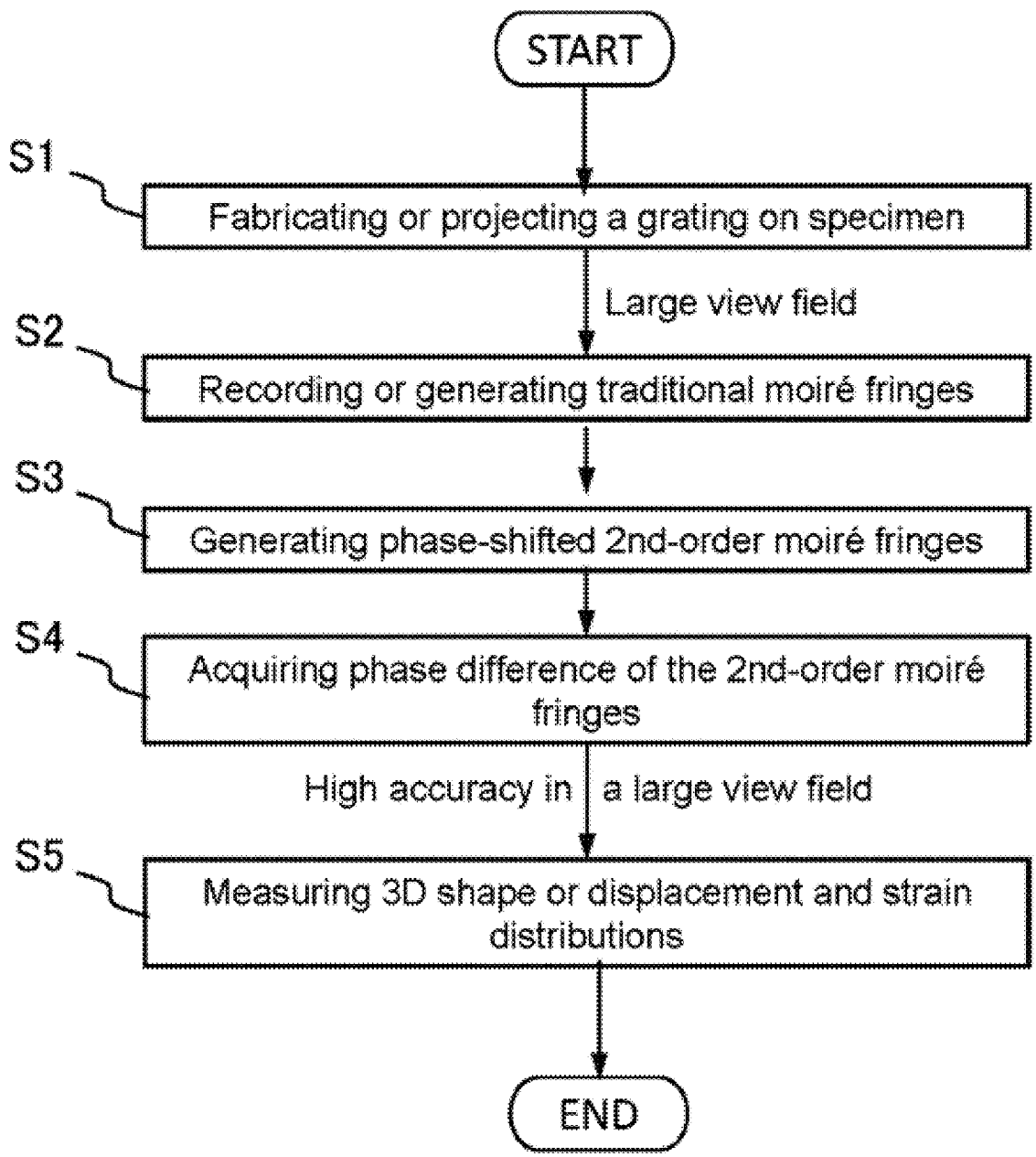
FIG. 9 is a flowchart of the deformation measurement step in the proposed technique.
Figure 10:
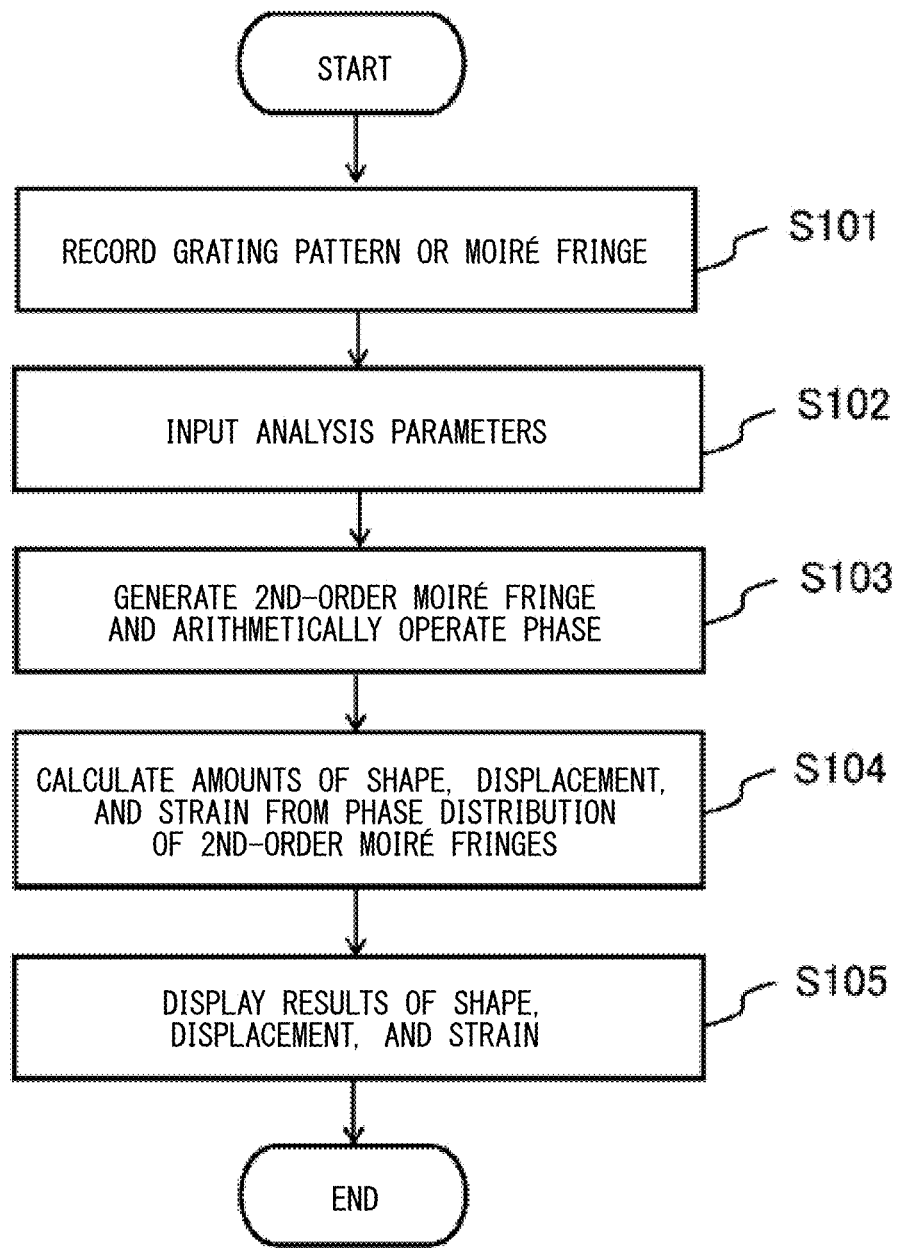
FIG. 10 is a flowchart of the deformation measurement program in the proposed technique.
Figure 11:
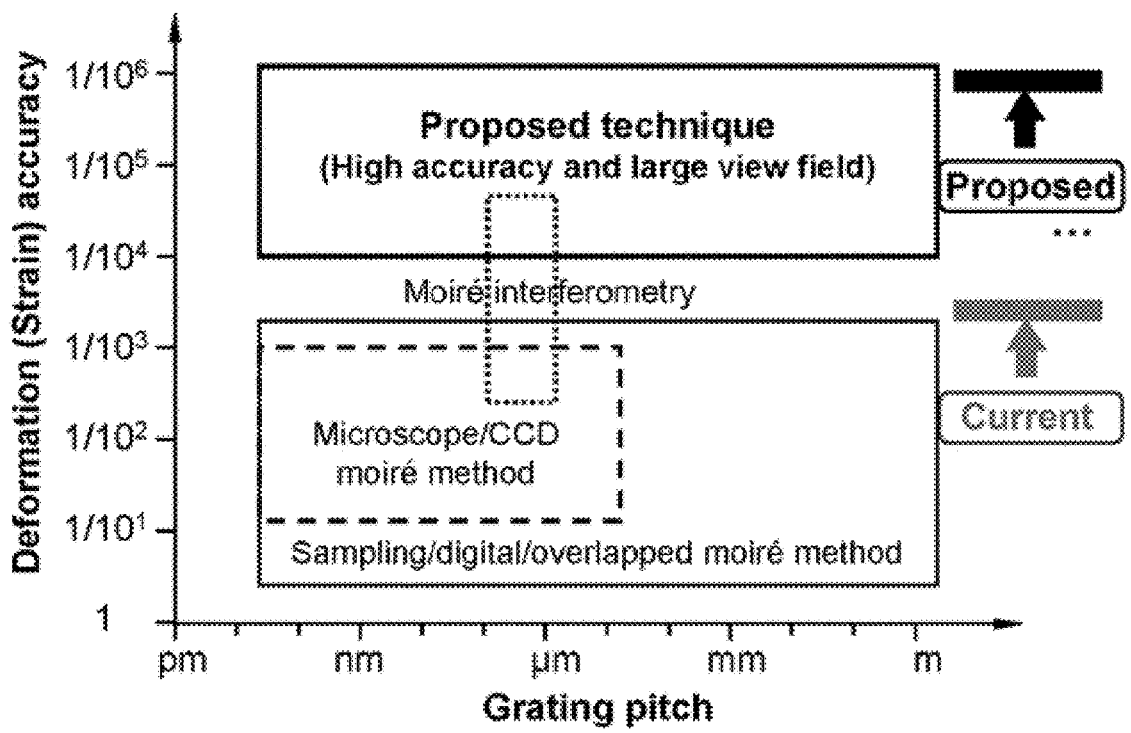
FIG. 11 is a table showing comparison between distributions of strain measurement accuracies of different moiré methods.
Figure 14:
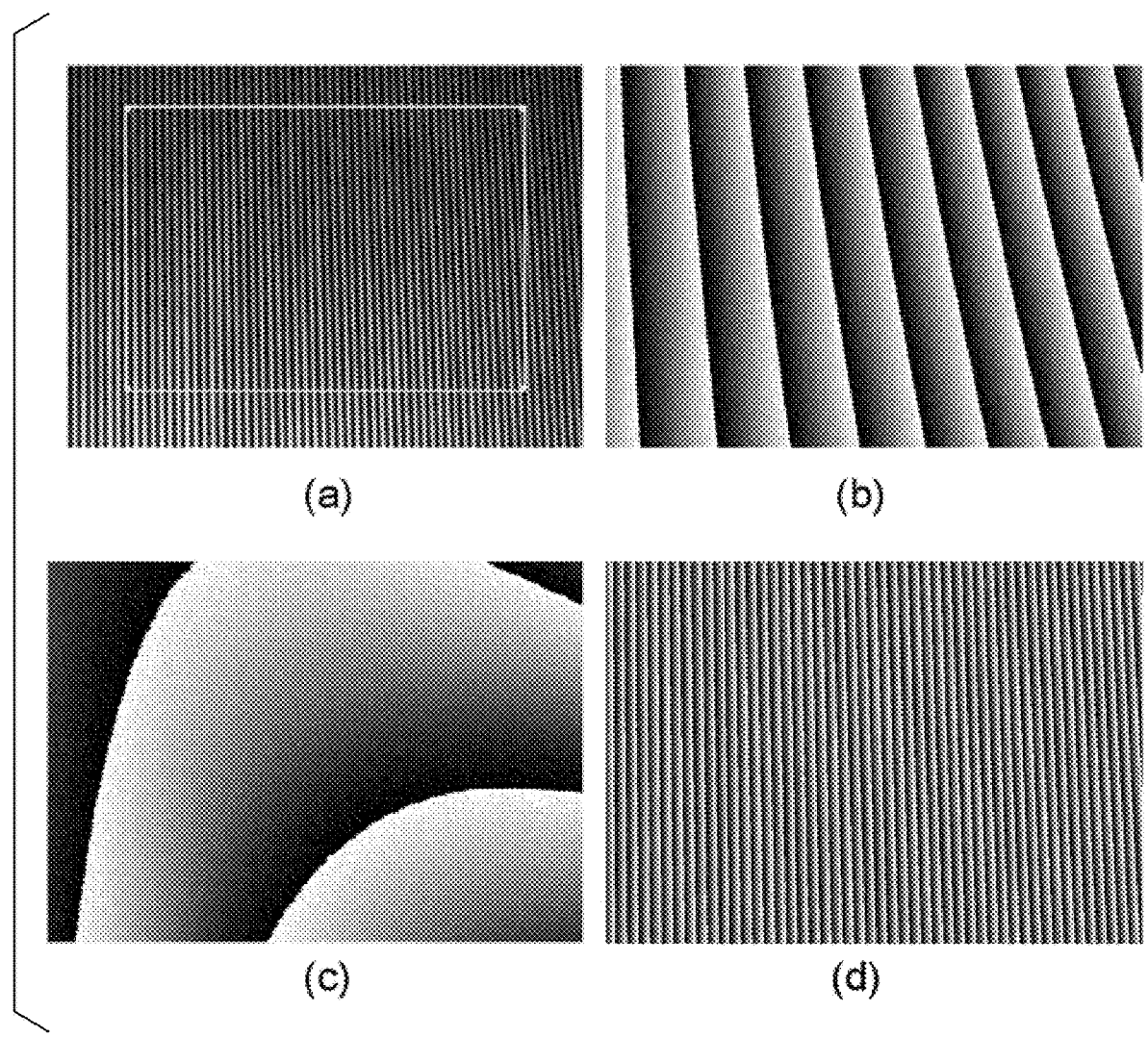
FIG. 14 shows an example of phase analysis performed on a projection grating by the 2nd-order moiré method.

FIG. 14 shows an example of analysis results obtained in the case in which the image of a grating, which is projected by a grating projection device, is captured by a camera, and is applied to a 2nd-order moiré method using the three-dimensional shape measurement device as shown in FIG. 7.

Here, the grating image captured by projecting sine waves having fixed cycles (cycles of 8 pixels in a projector) on the reference surface is shown in FIG. 14(a).

FIG. 14(b) shows a phase distribution of moiré fringes calculated using 25 phase-shifted moiré fringes by applying the traditional sampling moiré method to FIG. 14(a) to perform down-sampling and intensity interpolation on 25 pixels in the horizontal direction.

FIG. 14(c) shows the phase distribution of 2nd-order moiré fringes calculated by two-dimensional discrete Fourier transform by regarding these moiré fringe images as phase-shifted grating images, further performing down-sampling and intensity interpolation on 100 pixels in the horizontal direction, and using 2500 of 100×25 phase-shifted 2nd-order moiré fringe images to be generated.

FIG. 14(d) shows the phase distribution of the original projection grating obtained by adding the phase of the sampling point to the phase distribution of 2nd-order moiré fringes (Equation (7)).

In the case of this example, it is possible to generate 2500 phase-shifted moiré fringes from one grating image and to perform phase analysis with a higher level of accuracy.

Figure 15:
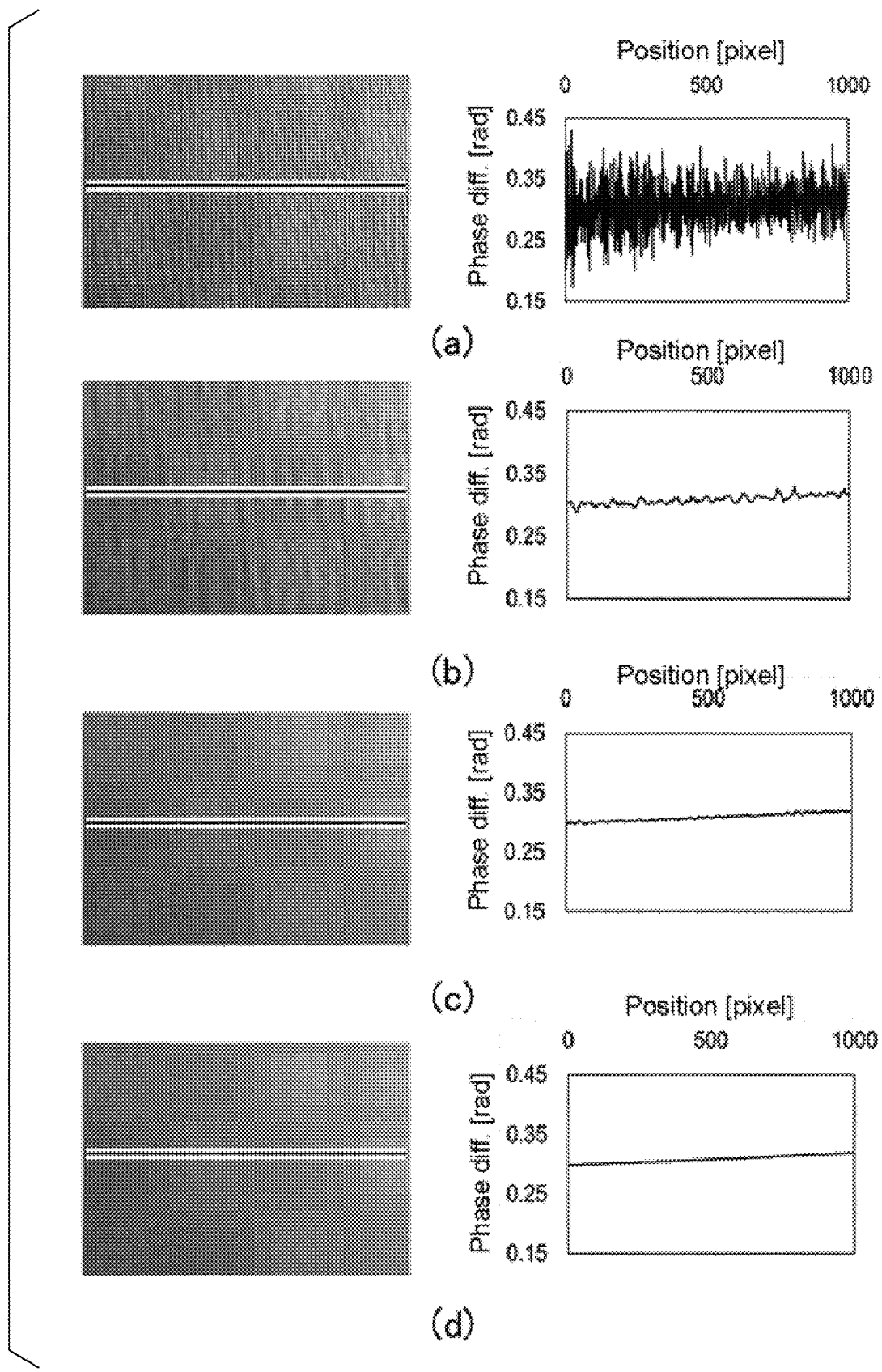
FIG. 15 is a diagram showing comparison between phase analysis results of projection gratings according to the traditional methods and the present invention.

FIG. 15 shows comparison results of analysis performed on the grating image on the reference surface as shown in the FIG. 14(a) according to the phase shifting method, the sampling moiré method, and the spatiotemporal phase shifting method which are traditional techniques and the present invention.

FIG. 15(a) shows results (phase gradient) obtained by horizontally spatially differentiating a phase distribution obtained by calculating eight captured phase-shifted grating images by the traditional phase shifting method.

The left diagram shows a phase gradient distribution, and the right diagram is the cross-sectional view of one horizontal center line.

Similarly, FIG. 15(b) shows results obtained by calculating one captured grating image by the sampling moiré method (the number of thinning-out is 25 pixels).

FIG. 15(c) shows results obtained by calculating eight captured phase-shifted grating images by the spatiotemporal phase shifting method (the number of thinning-out is 25 pixels).

FIG. 15(d) shows results obtained by calculating one captured grating image by the present invention (the number of thinning-out is 25 pixels at the first stage and is 100 pixels at the second stage).

A correct result is that the phase gradient of the reference surface is a smooth straight line with a certain inclination.

As can be seen from the results of FIG. 15, the traditional phase shifting methods have great measurement errors.

The sampling moiré method can perform phase calculation using one grating image but has a measurement error.

Since the spatiotemporal phase shifting method uses both temporal and spatial intensity information, the spatiotemporal phase shifting method is more accurate than the phase shifting method and the sampling moiré method but is not suitable for dynamic measurement because a plurality of images are required.

On the other hand, according to the present invention, the most accurate results are obtained using only one grating image, and thus the effectiveness of the present invention is shown.

Next, an example in which the dynamic three-dimensional shape is measured with high accuracy by the second method according to the present invention will be described.

Figure 16:
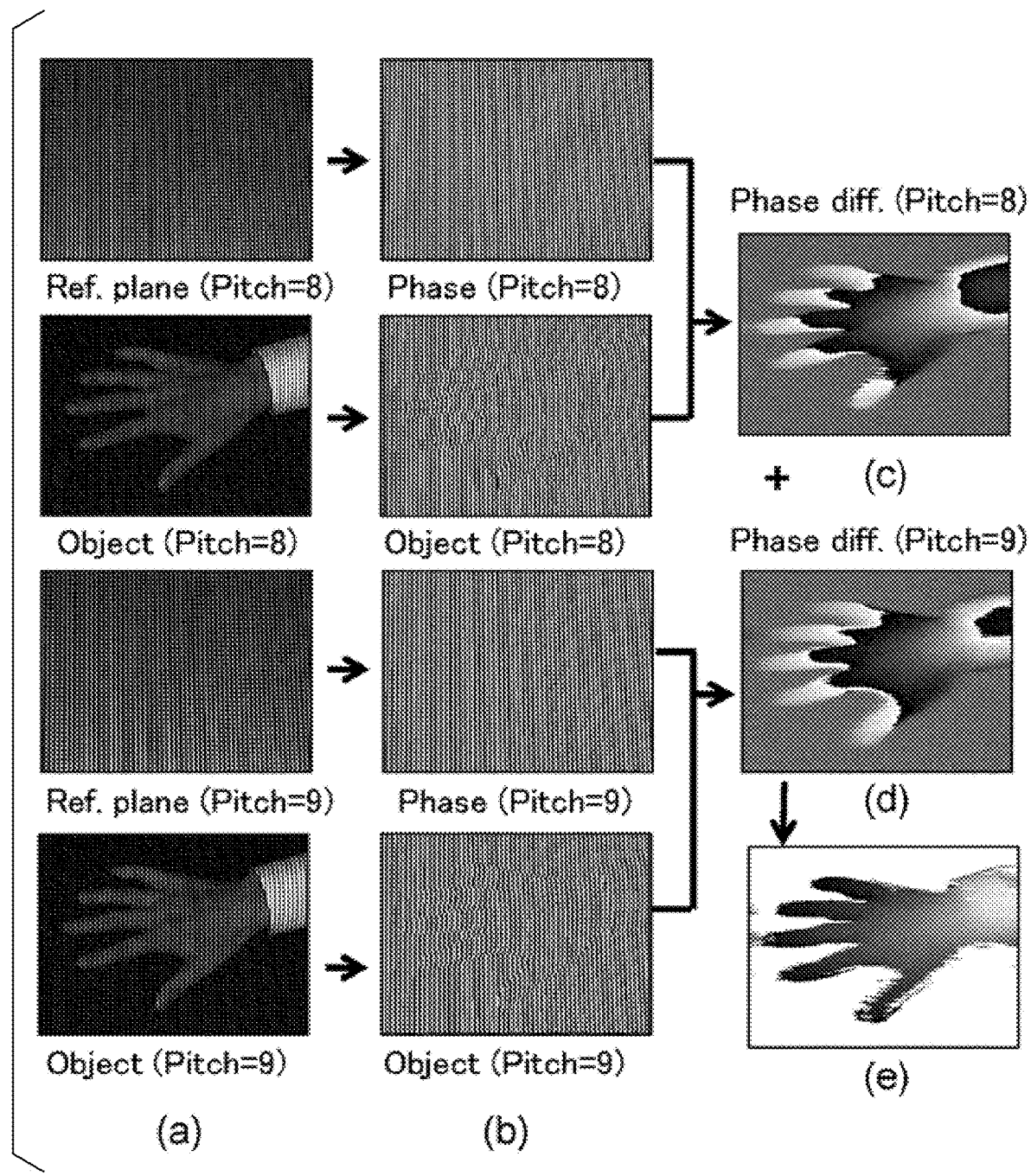
FIG. 16 shows an example in which the 2nd-order moiré method is applied to the measurement of the three-dimensional non-contact shape through grating projection.

FIG. 16 shows analysis results obtained by applying a reference surface and a grating image of an object (hand) obtained by capturing a grating, which is projected by a grating projection device, by a camera to the 2nd-order moiré method using the three-dimensional shape measurement device as shown in FIG. 7.

FIG. 16(a) shows images captured by cameras installed at different angles by projecting two types of sinusoidal grating patterns with grating pitch ratios of 8 and 9 on the reference surface and the object in order from the top.

Phase distributions calculated by performing the 2nd-order moiré method on these images are shown in FIG. 16(b).

Here, two types of grating patterns with grating pitch ratios of 8 and 9 are used so that a height can be measured even with an object having a depth.

The phase difference between the reference surface and the object in the case in which the grating pitch ratio is 8 is shown in FIG. 16(c), and similarly, the phase difference between the reference surface and the object in the case in which the grating pitch ratio is 9 is shown in FIG. 16(d).

Analysis conditions in the case in which the grating pitch ratio is 8 are the same as those in FIG. 14.

In analysis conditions in the case in which the grating pitch ratio is 9, the first down-sampling pitch is 29 pixels and the second down-sampling pitch is 110 pixels.

FIG. 16(e) shows the phase distribution after phase connection of the object (hand) which is obtained by applying the two types of phase difference results shown in FIGS. 16(c) and 16(d) to an algorithm of phase connection using the existing grating with a plurality of pitches.

The height distribution of the object can be finally obtained by multiplying FIG. 16(e) by the height factor obtained by calibration.

Figure 17:
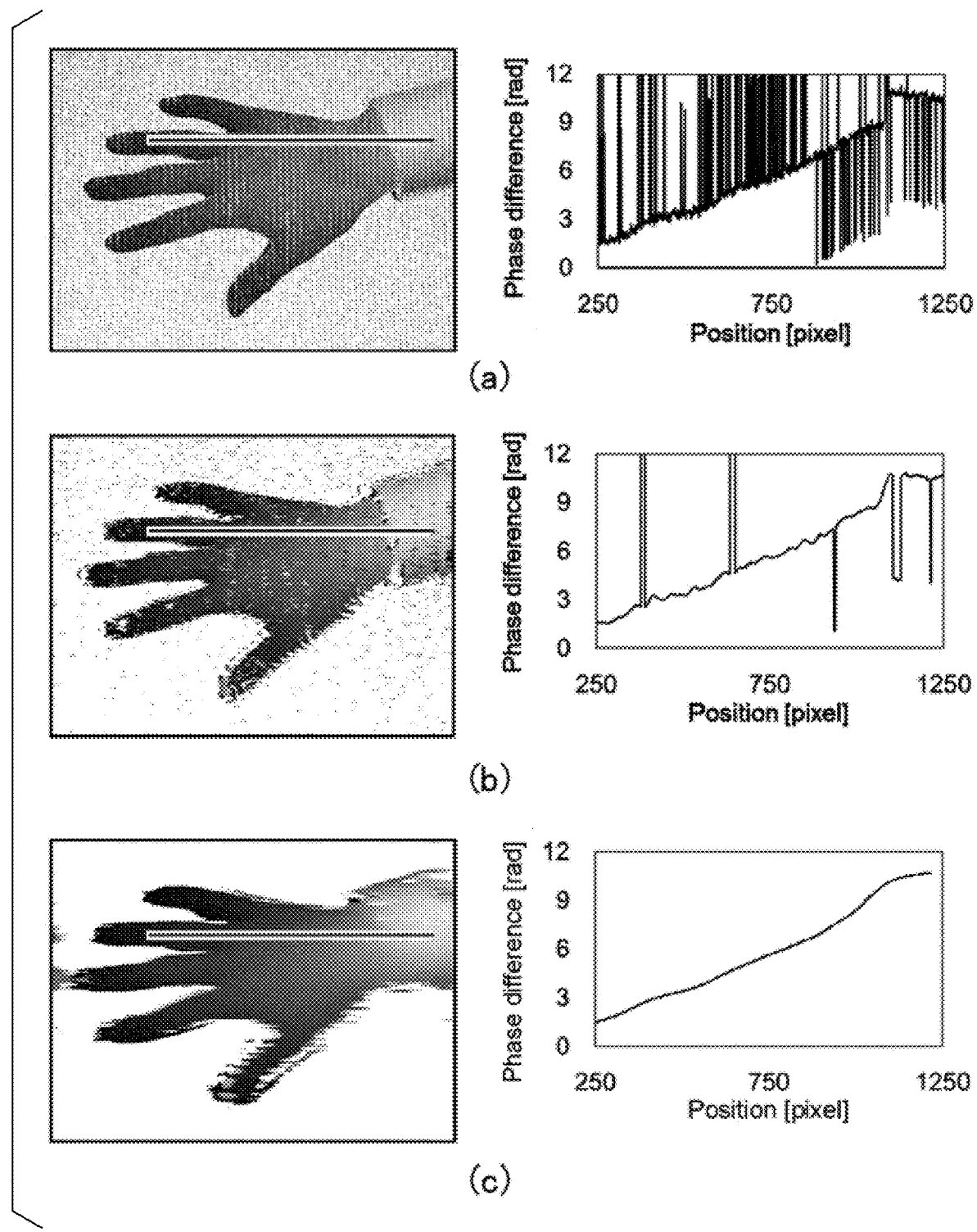
FIG. 17 is a diagram showing comparison between height measurement results of objects according to the traditional methods and the present invention.

FIG. 17 shows results of measurement of the height of the hand which are obtained by the traditional phase shifting method and the sampling moiré method and the 2nd-order moiré method according to the present invention.

FIG. 17(a) shows results of measurement performed by the traditional phase shifting method, and shows data regarding the shape of the hand which is obtained using a total of 17 images of eight images obtained by shifting the phase of the grating image having the grating pitch ratio of 8 by 2 π/8 and nine images obtained by shifting the phase of the grating image having the grating pitch ratio of 9 by 2π/9.

The left side shows shape distributions, and the right side shows data regarding one horizontal line.

FIG. 17(b) shows results of measurement performed by the sampling moiré method. A dynamic shape can be measured using only a total of two images of an image having the grating pitch ratio of 8 and an image having the grating pitch ratio of 9, but there is a problem in that the measurement results have much noise.

FIG. 17(c) shows results obtained by the 2nd-order moiré method according to the present invention.

This example shows analysis results in a condition in which the signal-noise (SN) ratio of the projected grating pattern is extremely low.

Therefore, the phase shifting method (FIG. 17(a)) and the spatiotemporal phase shifting method require a large number of phase-shifted grating images, and thus it is difficult to apply the methods to dynamic measurement.

On the other hand, the sampling moiré method (FIG. 17(b)) is suitable for dynamic measurement. However, measurement results have much noise, and there are many locations where the shape cannot be measured well.

According to the present invention (FIG. 17(c)), it can be confirmed that it is possible to calculate the shape of the hand with less measurement errors using only a total of two images of an image having the grating pitch ratio of 8 and an image having the grating pitch ratio of 9.

As can be seen from the experiment results of FIG. 17, the present invention is effective for high-accuracy and dynamic three-dimensional shape measurement.

However, the present technique using the 2nd-order moiré method uses intensity information in a wide field of view, and thus it is necessary to note that the present technique is not suitable for measurement of a rapidly changing object.

Example 4

Simulation Verification of Proposed Technique in Uniform Deformation Measurement Example 4 is an example in which accuracy is verified in the case in which the proposed 2nd-order moiré method is performed through simulation and uniform deformation measurement is performed.

Figure 18:
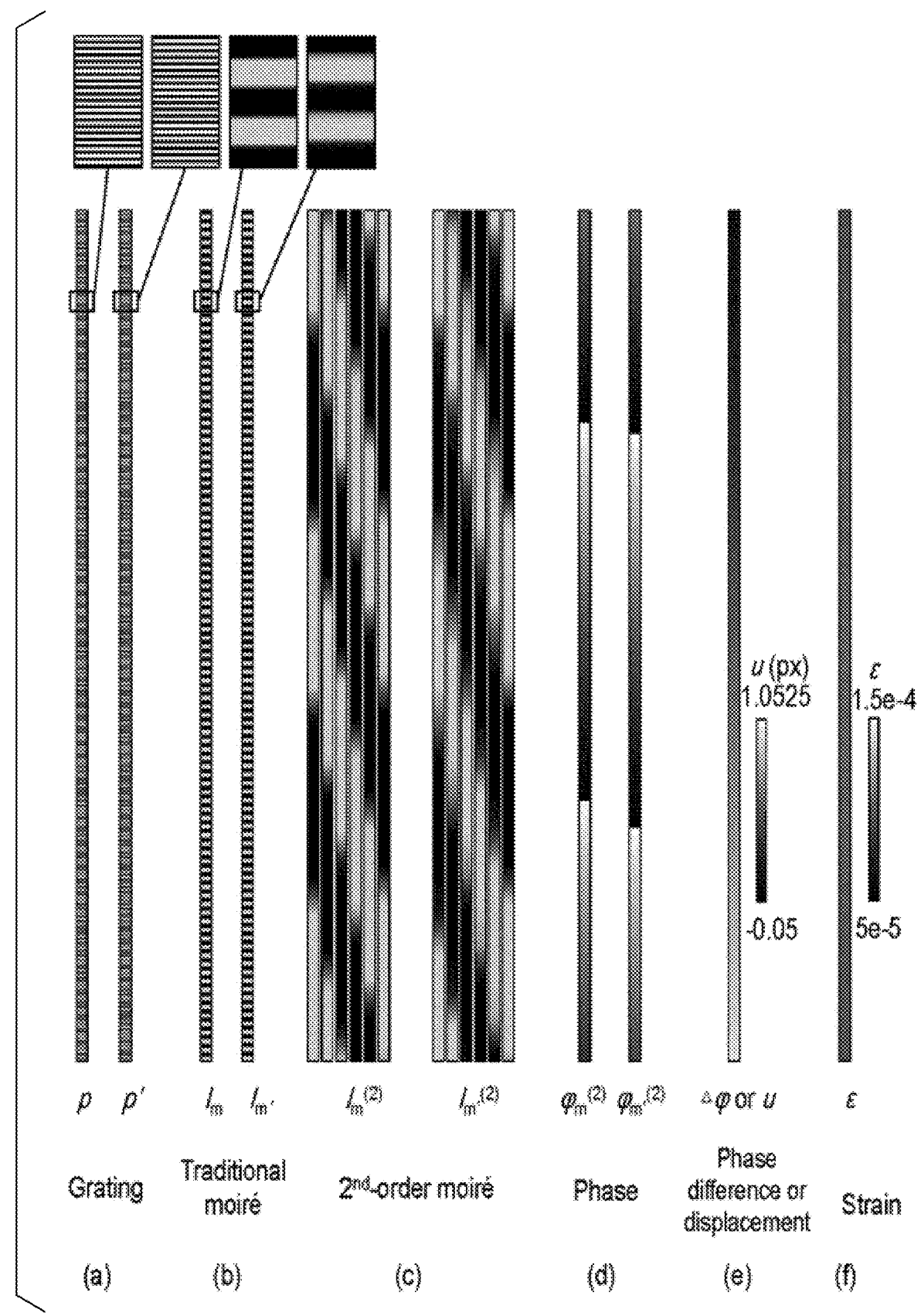
FIG. 18 is a diagram showing simulation verification results of uniform deformation measurement in the proposed technique.

A regular grating having a 10-pixel pitch can be linearly extended and the current strain is 100με (FIG. 18(a)). A grating image of the regular grating was 10,000 pixels long.

The micron strain (με) mentioned here is a minus sixth power of 10 in the unit of the amount of strain.

When the pitch of the reference grating was 9 pixels, well-known digital sampling moiré fringes before and after deformation were obtained (FIG. 18(b)).

Both intervals between the well-known moiré fringes before and after deformation were approximately 90 pixels.

Known moiré fringes were treated as regular gratings and down-sampled by 88 pixels, and 2nd-order moiré fringes before and after deformation were obtained in combination with the spatial phase shifting method (FIG. 18(c)).

The phase of the 2nd-order moiré fringes before and after deformation was calculated using the present invention (FIG. 18(d)).

Next, changes in phase and displacements having the same distribution characteristics were measured (FIG. 18(e)).

Finally, the strain distribution was determined, so that the mean strain of 101με was obtained.

As compared with the preset strain 100με, the measurement error was only 1με, and the accuracy of this measurement method was confirmed.

Example 5

Figure 19:
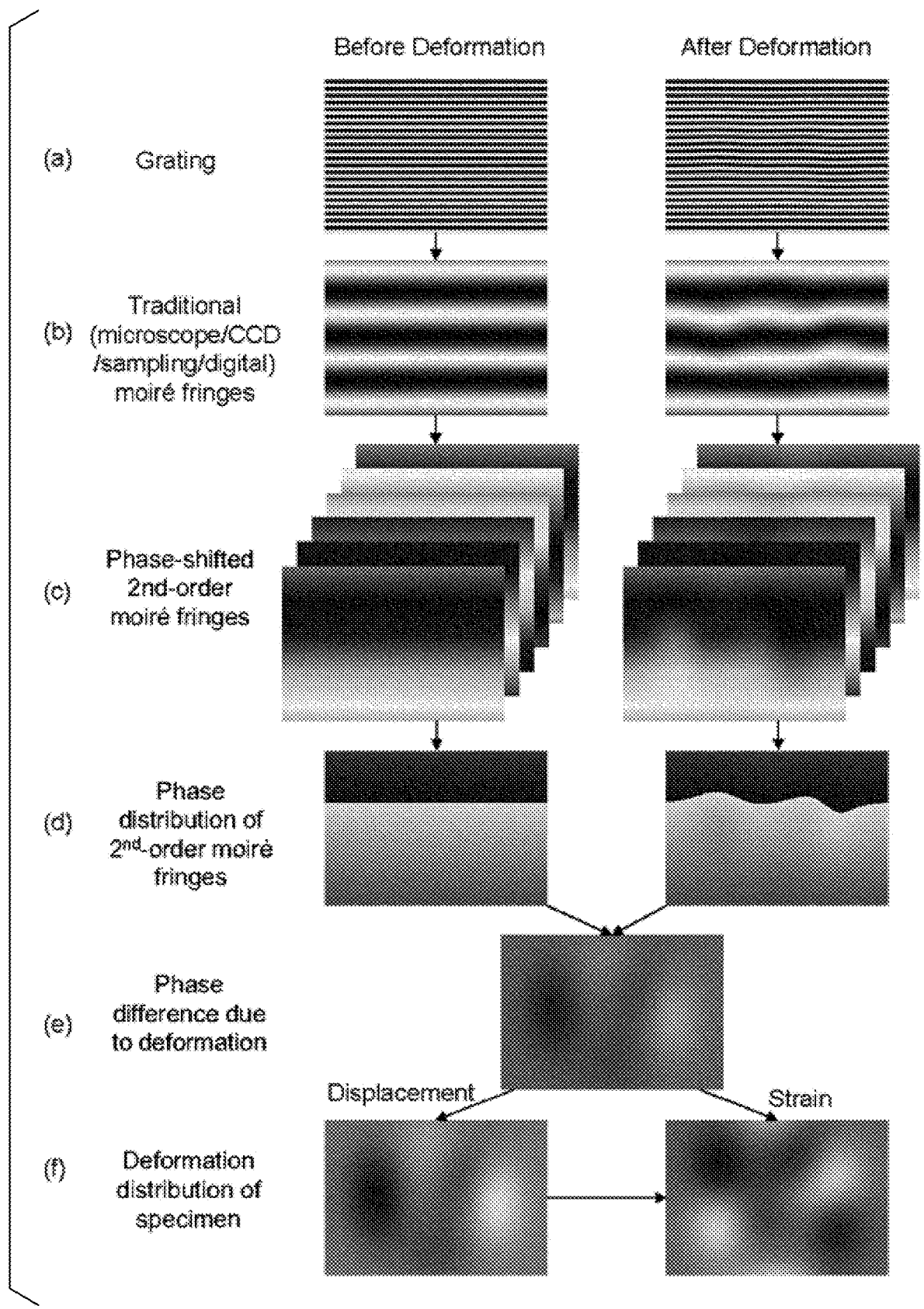
FIG. 19 is a diagram showing simulation verification results of non-uniform deformation measurement in the proposed technique.

Simulation Verification of Proposed Technique in Non-Uniform Deformation Measurement The present example is an example indicating that distribution characteristics (FIG. 19) of measurement of the non-uniform displacement and strain are the same as theoretical characteristics.

A numerical value obtained from MATLAB function peaks (x, y) was added to the phase of a regular grating of 8.1 pixels per pitch (the left side in FIG. 19(a), before deformation) to deform the regular grating (the right side in FIG. 19(a), after deformation).

A grating image was 256×180 pixels.

When the reference grating pitch was set to 7 pixels, known moiré fringes before and after deformation appeared (FIG. 19(b)).

An interval between the known moiré fringes before and after deformation was 46 to 57 pixels.

Phase-shifted 2nd-order moiré fringes before and after deformation were obtained in combination with the spatial phase shifting method by down-sampling the known moiré fringes by 41 pixels (FIG. 19(c)).

The phase of the moiré fringes before and after deformation was obtained using the present invention (FIG. 19(d)).

Changes in the phases (FIG. 19(e)) and displacement and strain distributions were measured.

Distribution characteristics of the measured displacement and strain (FIG. 19(f)) matched theoretically obtained results.

Example 6

Simulation Verification of Proposed Technique of Inclined Grating with Random Noise In the present example, measurement of the displacement of an inclined grating with random noise will be described.

The angle of inclination of the grating line was 0.0086 rad, the grating pitch in the vertical direction was 2.0572 pixels, and the grating image was 1300×900 pixels.

A random noise with amplitude of 10% of the grating amplitude was added to the inclined grating, and images in the cases in which tensile strains equivalent to 50με, 100με, 500με, 1000με and 2000με were loaded were generated through simulation.

Figure 20:
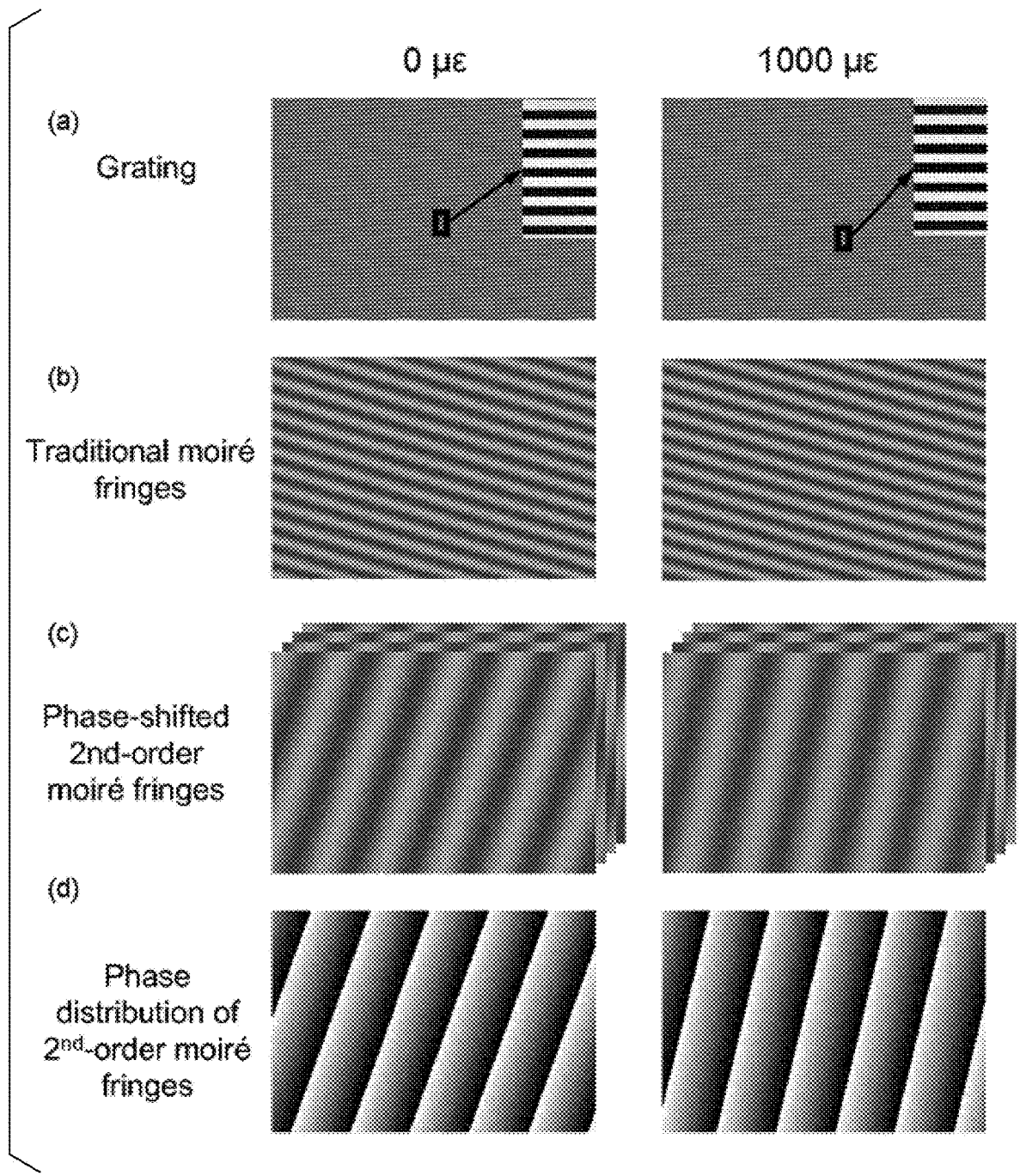
FIG. 20 is a diagram showing analysis results of displacement and strain distributions obtained using inclined gratings having random noise in the case in which strain values obtained by simulation are $0\mu\varepsilon$ and $1000\mu\varepsilon$.

The process of generating moiré fringes and 2nd-order moiré fringes in the cases in which strains are 0με and 1000με is shown in FIG. 20. It is possible to measure displacement and strain from the phase difference between 2nd-order moiré fringes.

Figure 21:
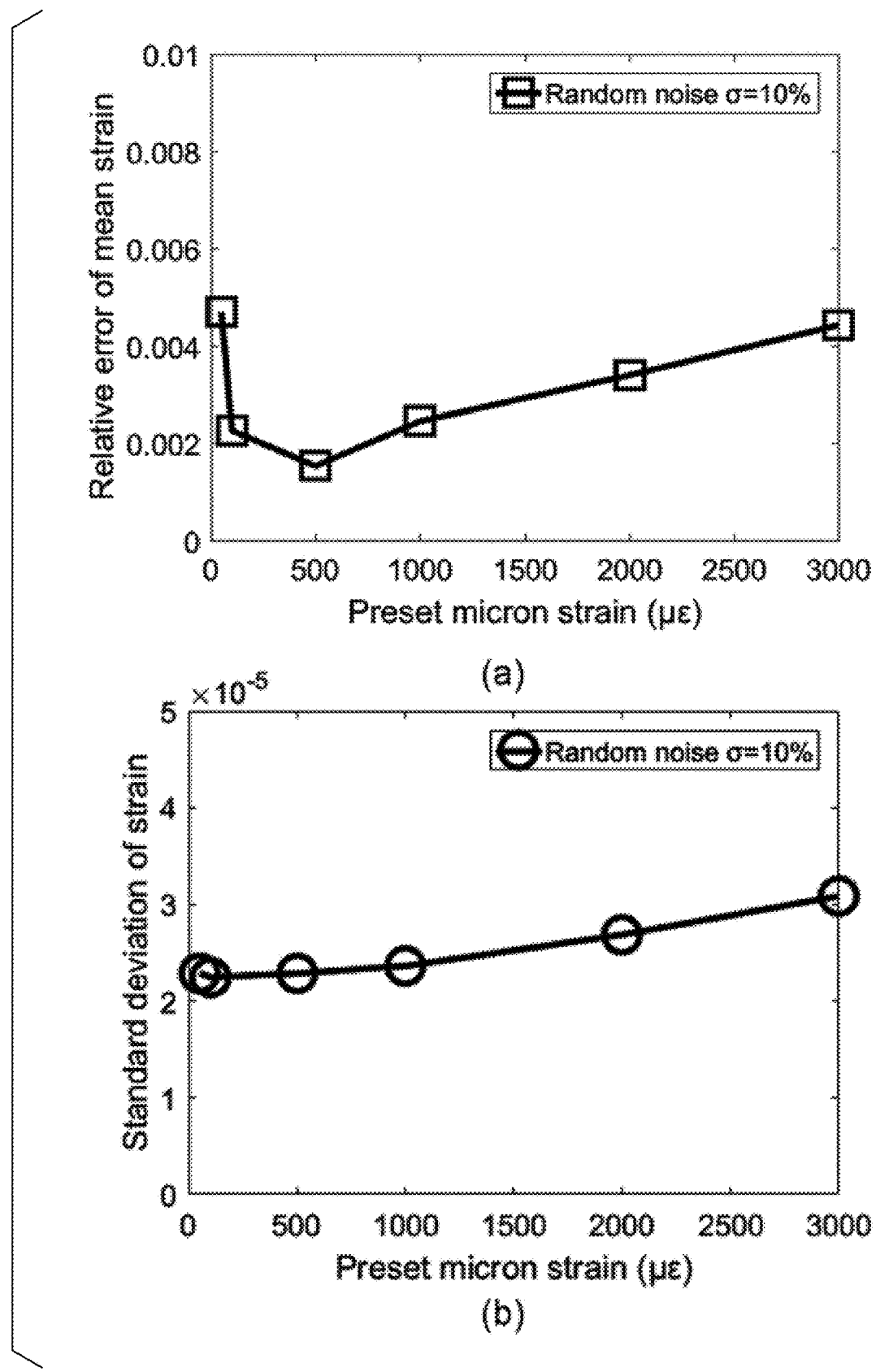
FIG. 21($a$) is diagram showing the error of the mean strain measured by the 2nd-order moiré method on the basis of the strain value (preset) obtained by simulation, and FIG. 21($b$) is diagram showing the standard deviation of the measured strain.

Errors of the mean strain measured by setting strains given through simulation to the horizontal axis are shown in FIG. 21(*a*).

FIG. 21(*b*) shows the standard deviation of the measured strain.

Since all of relative errors are less than 1% and standard deviations are less than $4 \times 10^{-5}$, it can be confirmed that high-accuracy strain measurement can be performed.

Example 7

Experimental Verification of Deformation of Loaded Aluminum

In the present example, validity and accuracy of the proposed deformation measurement are shown through experiment.

Figure 22:
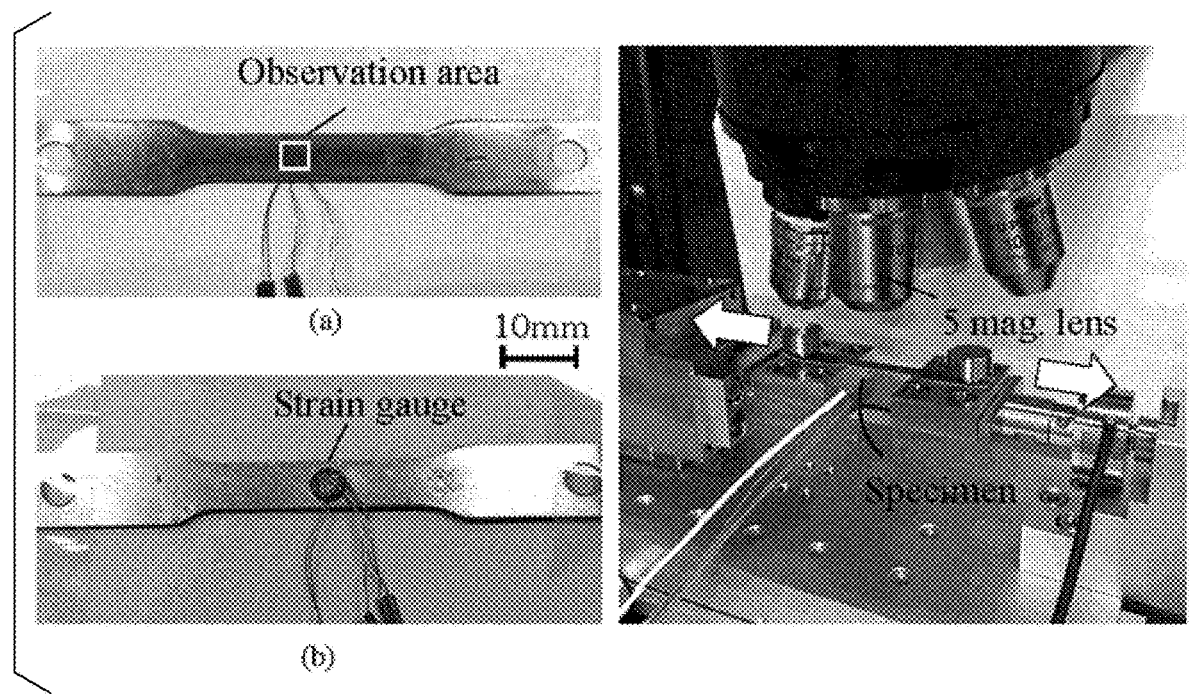
FIG. 22 is photographs showing an aluminum test piece and setup of a tension experiment using a laser microscope.

An aluminum specimen was stretched under a laser microscope (FIG. 22).

Dimensions of the aluminum specimen were 27, 6.3, and 0.5 (mm) in length, width, and thickness, respectively.

A grating having a pitch of 3.0 μm was manufactured on the surface of the aluminum specimen by UV nanoimprint lithography.

After a strain gauge is attached to the side opposite to the specimen, a tensile load was applied under the microscope.

Laser scanning moiré fringes generated due to interference between the grating on the specimen and the scanning line was observed by making the magnification of the objective lens as 5 times.

A series of laser scanning moiré fringes were recorded during the tension process.

Figure 23:
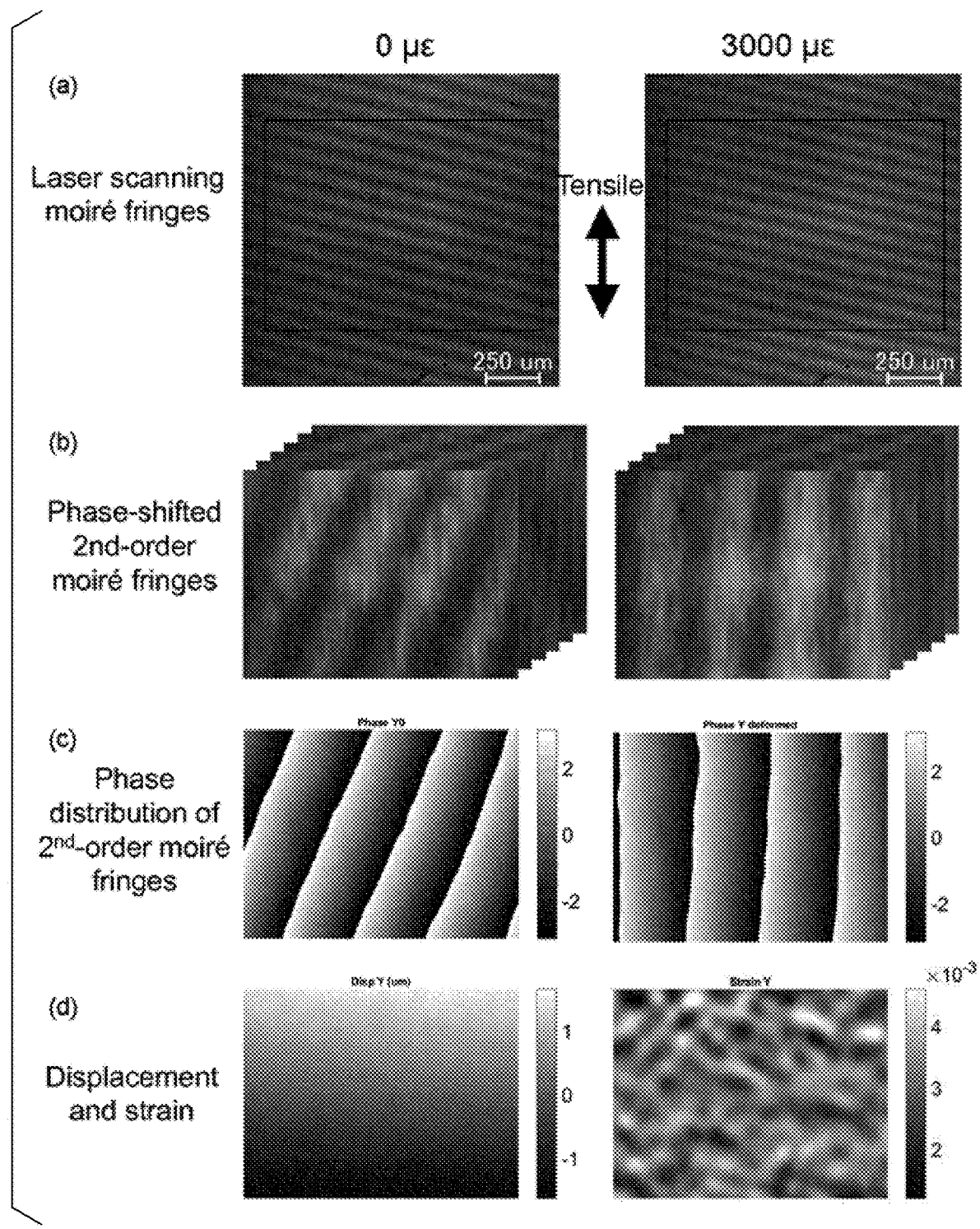
FIG. 23 is a diagram showing results of displacement and strain distribution measurement performed by the 2nd-order moiré method when the strain gauge value is $3000\mu\varepsilon$ during the tension test for the aluminum test piece.

FIG. 23 shows the deformation measurement process for the aluminum specimen under the tensile load by taking the case in which the value of the strain gauge is 3000με as an example.

Figure 24:
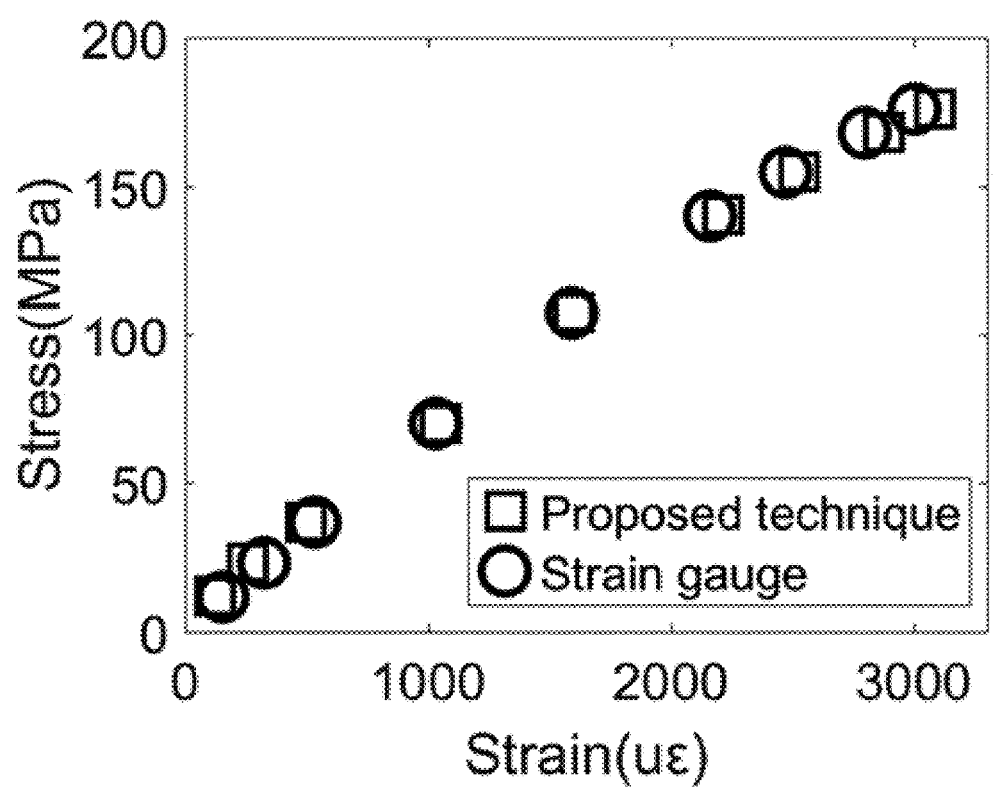
FIG. 24 is a diagram showing comparison between the stress curve and the strain curve of the aluminum specimen which are obtained using the proposed technique and a strain gauge.

FIG. 24 shows stress-strain curves of the aluminum specimen obtained using the mean strain evaluated from the proposed technique and the strain evaluated from the strain gauge.

The value of the mean strain evaluated from the proposed technique is well matched with that of the strain gauge method, and thus it is possible to verify the validity and measurement accuracy of the proposed technique.

INDUSTRIAL APPLICABILITY

The proposed 2nd-order moiré method and its program can be used to measure full-field displacements and strains of various materials and structure from nanoscale to meter scale.

Analyzable objects include metals, polymers, ceramics, semiconductors, composite materials, hybrid structures, and thin films in industrial fields such as aerospace, automobiles, electronic packaging, biomedical fields, military, and material manufacture.

Typical applications in the industrial field mainly include the following four aspects.

1) Evaluation of Separation, Crack Propagation, and Instability Mode

The proposed technique can predict the region where a crack occurs by finding the strain concentration region from full-field deformation.

The form of crack propagation can be evaluated by measuring the deformation distribution near the tip of the crack.

It is possible to quantitatively analyze modes of damages including an instability mode, layer separation, buckling, and a crack due to various mechanical loads, electric loads, thermal loads, magnetic loads, and combined loads thereof.

2) Evaluation of Residual Strain and Stress Distribution, and Provision of Optimized Design Guidelines It is possible to detect the residual strain inside a material and the influence on its structural stability in combination with a stress release method (heating, a hole drilling method, a ring core method, or the like).

Measurement of the deformation distribution in the vicinity of an interface helps to find areas that are easily destroyed and provides guidance for strengthening and toughening materials and optimal design of materials and interfaces.

3) Evaluation of Mechanical Properties and Monitoring of Structural Health

Deformation measurement information can be used to determine material constants such as a stress-strain curve, a Young's modulus, a Poisson's ratio, an elastic limit, a yield strength, and an ultimate strength.

It is possible to evaluate displacement and strain distributions caused by a mechanical, electrical, or thermal load for structural health monitoring.

4) Evaluation of Height, Depth, and Flatness and Control of Manufacturing Quality It is possible to quantitatively evaluate the height, depth, surface flatness, and the out-of-plane displacement of an object from the measured three-dimensional shape. The proposed technique is useful for industrial fields such as control of manufacturing quality, machine vision, and automatic processing.

REFERENCE SIGNS LIST

1 Computer
2 Monitor
3 Imaging sensor (various cameras and microscopes)
4 Grating projection device
5 Three-dimensional object as measurement target
6 Reference surface (planar object)
7 Structural material as measurement target
8 Minute grating (one-dimensional or two-dimensional)
11 Grating projection control unit
12 Fringe grating image storage unit
13 2nd-order moiré fringe generation unit and phase analysis arithmetic operation unit
14 Three-dimensional shape arithmetic operation unit
15 Displacement and strain arithmetic operation unit

The invention claimed is:
1. A method for measuring a displacement distribution: comprising
a first step for obtaining a first moiré fringe by first down-sampling and intensity interpolation to a grating image in a predetermined direction, the grating image displaying a lattice on a specimen;

a second step for generating a second moiré fringe by second down-sampling and intensity interpolation to the first moiré fringe in the predetermined direction; and a third step for calculating the displacement distribution in the predetermined direction or a depth direction based on a phase difference distribution of the second moiré fringe before and after deformation.

2. The method according to claim 1, wherein the first step comprises a step of generating T frames of the first moiré fringes with phases shifted by t times of a reciprocal of T, t denoting an integer greater than or equal to 0 and less than or equal to T−1, T denoting a first down-sampling pitch for the first down-sampling; and the second step comprises a step of generating $T^{(2)}$ frames of the second moiré fringe with phases shifted by k times of a reciprocal of $T^{(2)}$, k denoting an integer greater than or equal to 0 and less than or equal to $T^{(2)}$−1, $T^{(2)}$ denoting a second down-sampling pitch for the second down-sampling; and a step of generating the phase distribution of the second moiré fringe by performing Fourier transform of the $T \cdot T^{(2)}$ frames of the second moiré fringe.

3. The method according to claim 1, further comprising a fourth step of adjusting the pitch of the first moiré fringe by multiplying the phase of the first moiré fringe by an adjustment factor N, N denoting an integer greater than or equal to 2; wherein the first moiré fringe with the adjusted phase is applied to the second step.

4. The method according to claim 1, wherein the first step is characterized by scanning the grating image with a predetermined first down-sampling pitch to record the first moiré fringe.

5. The method according to claim 1, further comprising a fourth step of calculating a strain distribution by differentiating the displacement distribution in the predetermined direction; wherein the grating is imparted on the surface of the specimen.

6. The method according to claim 1, wherein the phase difference distribution is a difference between the phase distribution of the second moiré fringe derived from the grating on a reference surface and the phase distribution of the second moiré fringe derived from the grating on the specimen, the grating projected by a projecting device; and the third step comprises a step of calculating the displacement distribution in the depth direction based on the phase difference distribution and a conversing factor regarding a relation between a distance in the depth direction and the phase difference, the displacement distribution being a shape of the specimen.

7. An apparatus for measuring a displacement distribution: comprising storage circuitry configured to obtain a first moiré fringe by first down-sampling and intensity interpolation to a grating image in a predetermined direction, the grating image displaying a lattice on a specimen;

generation circuitry configured to generate a second moiré fringe by second down-sampling and intensity interpolation to the first moiré fringe in the predetermined direction; and arithmetic operation circuitry configured to calculate the displacement distribution in the predetermined direction or a depth direction based on a phase difference distribution of the second moiré fringe before and after deformation.

8. A computer program product stored in a non-transitory computer-readable medium that is programmed for measuring a displacement distribution to perform:

a first step of obtaining a first moiré fringe by first down-sampling and intensity interpolation to a grating image in a predetermined direction, the grating image displaying a lattice on a specimen;

a second step of generating a second moiré fringe by second down-sampling and intensity interpolation to the first moiré fringe in the predetermined direction; and a third step of calculating the displacement distribution in the predetermined direction or a depth direction based on a phase difference distribution of the second moiré fringe before and after deformation.

\* \* \* \* \*